(12) United States Patent
Kodama et al.

(10) Patent No.: US 10,072,605 B2
(45) Date of Patent: Sep. 11, 2018

(54) INTERNAL COMBUSTION ENGINE

(71) Applicant: TOYOTA JIDOSHA KABUSHIKI KAISHA, Toyota, Aichi-ken (JP)

(72) Inventors: Kohei Kodama, Numazu (JP); Shintaro Utsumi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 142 days.

(21) Appl. No.: 15/161,514

(22) Filed: May 23, 2016

(65) Prior Publication Data

US 2016/0348610 A1 Dec. 1, 2016

(30) Foreign Application Priority Data

May 25, 2015 (JP) ................. 2015-105598

(51) Int. Cl.
| | |
|---|---|
| *F02F 1/40* | (2006.01) |
| *F01P 3/02* | (2006.01) |
| *F01P 7/16* | (2006.01) |
| *F02F 1/36* | (2006.01) |
| *F02F 1/42* | (2006.01) |
| *F02B 31/06* | (2006.01) |

(Continued)

(52) U.S. Cl.
CPC ............. *F02F 1/40* (2013.01); *F01P 3/02* (2013.01); *F01P 7/16* (2013.01); *F02B 31/06* (2013.01); *F02F 1/36* (2013.01); *F02F 1/425* (2013.01); *F01P 2003/024* (2013.01); *F01P 2007/146* (2013.01); *F02M 35/10255* (2013.01); *Y02T 10/146* (2013.01)

(58) Field of Classification Search
CPC ........ F02F 1/40; F01P 3/02; F01P 7/16; F01P 2003/024; F01P 2007/146
See application file for complete search history.

(56) References Cited

U.S. PATENT DOCUMENTS

| | | | |
|---|---|---|---|
| 4,726,325 A | 2/1988 | Itakura | |
| 5,331,929 A * | 7/1994 | Plantan | F01L 1/28 123/65 V |

(Continued)

FOREIGN PATENT DOCUMENTS

| | | |
|---|---|---|
| CN | 101155983 A | 4/2008 |
| CN | 103221664 A | 7/2013 |

(Continued)

*Primary Examiner* — Jacob Amick
*Assistant Examiner* — Charles Brauch
(74) *Attorney, Agent, or Firm* — Hunton Andrews Kurth LLP

(57) ABSTRACT

A low-temperature cooling water channel formed in the internal combustion engine includes a water jacket that covers at least one portion of a wall surface of an intake port. The intake port has a cooled wall surface that is covered by the water jacket, and a non-cooled wall surface that is not covered by the water jacket. An airflow control valve is provided on an intake-air upstream side of the cooled wall surface. The airflow control valve is configured to be capable of changing a ratio between a flow rate of intake air that flows along the side of the cooled wall surface and a flow rate of intake air that flows along the side of the non-cooled wall surface. The airflow control valve is preferably configured as a tumble control valve (TCV).

5 Claims, 13 Drawing Sheets

(51) Int. Cl.
*F01P 7/14* (2006.01)
*F02M 35/10* (2006.01)

(56) References Cited

U.S. PATENT DOCUMENTS

| | | | | |
|---|---|---|---|---|
| 5,560,331 A | * | 10/1996 | Komatsu | F02F 1/4264 |
| | | | | 123/193.5 |
| 2001/0029917 A1 | * | 10/2001 | Suzuki | F02B 27/02 |
| | | | | 123/184.31 |
| 2009/0272356 A1 | * | 11/2009 | Abe | F02B 31/06 |
| | | | | 123/184.56 |
| 2012/0210954 A1 | * | 8/2012 | Nishikawa | F01P 3/02 |
| | | | | 123/41.08 |
| 2012/0227704 A1 | | 9/2012 | Omura | |
| 2014/0238330 A1 | | 8/2014 | Matsuzaki et al. | |
| 2015/0136055 A1 | | 5/2015 | Ishihara | |

FOREIGN PATENT DOCUMENTS

| | | |
|---|---|---|
| JP | 57-81118 A | 5/1982 |
| JP | 60-155771 U1 | 10/1985 |
| JP | 62-247112 A | 10/1987 |
| JP | 2007032560 A | 2/2007 |
| JP | 2013044299 A | 3/2013 |
| JP | 2013-133746 A | 7/2013 |
| JP | 2013-256879 A | 12/2013 |
| JP | 2014-163366 A | 9/2014 |

* cited by examiner

TUMBLE FLOW STRENGTHENING REQUEST (A)

INTAKE AIR COOLING REQUEST (B)

(C)

TUMBLE FLOW STRENGTHENING REQUEST (A)

+

INTAKE AIR COOLING REQUEST (B)

⇩

(C)

INTERNAL COMBUSTION ENGINE

CROSS-REFERENCE TO RELATED APPLICATION

The present application claims priority to Japanese Patent Application No. 2015-105598 filed on May 25, 2015, which is incorporated herein by reference in its entirety.

TECHNICAL FIELD

The present invention relates to an internal combustion engine, and more particularly to an internal combustion engine that includes a cylinder head in which a channel through which cooling water flows is formed.

BACKGROUND

A channel through which cooling water flows is formed in a cylinder head of an internal combustion engine. Japanese Patent Laid-Open No. 2013-133746 discloses a configuration in which, in order to cool air inside an intake port, a first cooling water circuit through which cooling water that cools the periphery of an intake port circulates is provided inside a cylinder head independently from a second cooling water circuit through which cooling water that cools the periphery of an exhaust port circulates that is provided inside a cylinder block and the cylinder head.

SUMMARY

An operating region of an internal combustion engine can be identified by means of the engine torque and engine speed. An appropriate intake air temperature (requested intake air temperature) for favorable combustion differs depending on the operating region. Consequently, with respect to the temperature of cooling water for cooling intake air also, the temperature required for favorable combustion differs depending on the operating region.

The operating region of an engine is continuously changing while the engine is operating. Therefore, the requested intake air temperature can change frequently accompanying changes in the operating region. However, because it takes time to adjust the temperature of cooling water, there is a problem that a response delay arises when it is attempted to respond to a change in the requested intake air temperature by adjusting the temperature of the cooling water.

The present invention has been made to solve the above described problem, and an object of the present invention is to provide an internal combustion engine that can cause the temperature of intake air that flows into a combustion chamber to change with favorable responsiveness.

In accomplishing the above object, according to a first aspect of the present invention, there is provided an internal combustion engine, comprising:

a low-temperature cooling water circulation system that is one of two cooling water circulation systems in which temperatures of cooling water are different, and that causes cooling water of a low temperature to circulate in a low-temperature cooling water channel formed in the internal combustion engine; and a high-temperature cooling water circulation system that is one of the two cooling water circulation systems, and that causes cooling water of a high temperature to circulate in a high-temperature cooling water channel formed in the internal combustion engine, the low-temperature cooling water channel including a water jacket covering at least one portion of a wall surface of an intake port, the intake port including:

a first wall surface that is an inner wall surface covered by the water jacket at least at one cross section among cross-sections that are perpendicular to a central trajectory of the intake port and a second wall surface that is an inner wall surface not covered by the water jacket at least at the one cross section;

wherein the internal combustion engine comprises an airflow control valve provided on an intake-air upstream side of the first wall surface, the airflow control valve being configured to be capable of changing a ratio between a flow rate of intake air that flows on a side of the first wall surface and a flow rate of intake air that flows on a side of the second wall surface.

According to a second aspect of the present invention, there is provided the internal combustion engine according to the first aspect, further comprising:

a control apparatus that controls the airflow control valve based on an operating region that is determined based on a speed and a load of the internal combustion engine;

wherein the control apparatus is configured to actuate the airflow control valve so that a ratio of a flow rate of intake air that flows on the side of the first wall surface with respect to a flow rate of intake air that flows on the side of the second wall surface increases in a case where the operating region belongs to an intake-air-cooling necessary region in which intake air cooling is necessary in comparison to a case where the operating region belongs to an intake-air-cooling unnecessary region in which intake air cooling is unnecessary.

According to a third aspect of the present invention, there is provided the cylinder head according to the first aspect, wherein the airflow control valve is a tumble control valve in which a valve body is driven around a rotary shaft to perform adjustment of a degree of opening thereof.

According to a fourth aspect of the present invention, there is provided the internal combustion engine according to the third aspect, wherein:

the rotary shaft of the tumble control valve is provided on a side of the first wall surface, and the first wall surface is provided on a side of a cylinder block mating surface of the intake port.

According to a fifth aspect of the present invention, there is provided the internal combustion engine according to the third aspect, wherein:

the rotary shaft of the tumble control valve is provided on a side of the first wall surface, and the first wall surface is provided on an opposite side to a side of a cylinder block mating surface of the intake port.

According to a sixth aspect of the present invention, there is provided the internal combustion engine according to the third aspect, wherein:

the first wall surface is provided on a side of a cylinder block mating surface of the intake port; and the tumble control valve has a configuration in which:

a rotary shaft is provided that extends from an inner wall surface of the intake port towards a facing inner wall surface, at a distal end portion of a support shaft that extends in a perpendicular direction from a position partway along the rotary shaft is provided the valve body that extends in a direction that is perpendicular to the support shaft, in a state in which the tumble control valve is open, the valve body is moved to a position along a side of the first wall surface, and as the tumble control valve closes, the valve body moves so as to block the intake port from the side of the first wall surface.

According to a seventh aspect of the present invention, there is provided the internal combustion engine according to the third aspect, further comprising:

a control apparatus that controls the tumble control valve based on an operating region that is determined based on a speed and a load of the internal combustion engine;

wherein the control apparatus is configured so that, in a case where the operating region belongs to a first operating region in which it is necessary to strengthen a tumble flow that is generated inside a cylinder, the control apparatus actuates the tumble control valve to a closing side more than in a case where the operating region belongs to a second operating region that is an operating region excluding the first operating region.

According to a eighth aspect of the present invention, there is provided the internal combustion engine according to the seventh aspect, wherein:

the intake port includes an inclined wall surface that inclines so as to progressively approach a central trajectory of the intake port in an intake-air downstream direction, and the first wall surface is provided on the inclined wall surface.

According to a ninth aspect of the present invention, there is provided the internal combustion engine according to the eighth aspect, wherein the control apparatus is configured so that, in a case where the operating region belongs to an intake-air-cooling unnecessary region in which intake air cooling is unnecessary and also belongs to the second operating region, the control apparatus actuates the tumble control valve to a predetermined intermediate degree of opening.

According to the first aspect of the present invention, a low-temperature cooling water channel includes a water jacket that covers at least one portion of a wall surface of an intake port. The intake port has a first wall surface and a second wall surface. The first wall surface is an inner wall surface that is covered by the water jacket at least at one cross-section among cross-sections that are perpendicular to a central trajectory of the intake port. The second wall surface is an inner wall surface that is not covered by the water jacket at least at the one cross-section. An airflow control valve is provided on an upstream side of the first wall surface. The airflow control valve is configured to be capable of changing a ratio between a flow rate of intake air that flows along the side of the first wall surface and a flow rate of intake air that flows along the side of the second wall surface. Intake air that flows along the side of the first wall surface is cooled by the water jacket. In contrast, intake air that flows along the side of the second wall surface is not cooled by the water jacket. According to the aspect of the present invention, since a ratio between the flow rate of intake air that flows along the side of the first wall surface and the flow rate of intake air that flows along the side of the second wall surface can be changed by the airflow control valve, it is possible to adjust the degree of cooling of intake air with favorable responsiveness.

According to the second aspect of the present invention, in a case where intake air cooling is necessary, the airflow control valve is controlled so that the ratio of the flow rate of intake air that flows along the side of the first wall surface with respect to the flow rate of intake air that flows along the side of the second wall surface increases compared to a case where intake air cooling is unnecessary. Therefore, according to the aspect of the present invention, because the intake air temperature can be adjusted in accordance with whether intake air cooling is necessary or unnecessary, it is possible to suppress knocking that is caused by a rise in the intake air temperature in a region in which intake air cooling is necessary, and to also suppress a deterioration in combustion that is caused by intake air cooling in a region in which intake air cooling is unnecessary.

According to the third aspect of the present invention, the degree of cooling of intake air can be adjusted with favorable responsiveness by an operation to open or close a tumble control valve.

According to the fourth aspect of the present invention, a rotary shaft of a tumble control valve is provided on the side of the first wall surface, and the first wall surface is provided on the side of a cylinder block mating surface of the intake port. In this configuration, when the valve body of the tumble control valve is driven to a closing side for the purpose of improving the combustion state by strengthening a tumble flow, the flow rate of intake air that flows along the side of the first wall surface is decreased relative to the flow rate of intake air that flows along the side of the second wall surface. Therefore, according to the aspect of the present invention, it is possible to adjust the degree of cooling of intake air with favorable responsiveness by performing an operation to open or close the tumble control valve for the purpose of improving the combustion state.

According to the fifth aspect of the present invention, the rotary shaft of the tumble control valve is provided on the side of the first wall surface, and the first wall surface is provided on an opposite side to the cylinder block mating surface of the intake port. In this configuration, when the valve body of the tumble control valve is driven to the closing side, the flow rate of intake air that flows along the side of the first wall surface is decreased relative to the flow rate of intake air that flows along the side of the second wall surface. Therefore, according to the aspect of the present invention, it is possible to adjust the degree of cooling of intake air with favorable responsiveness by performing an operation to open or close the tumble control valve.

According to the sixth aspect of the present invention, when the valve body of the tumble control valve is driven to the closing side so as to block the side of the first wall surface, the flow rate of intake air that flows along the side of the first wall surface is decreased relative to the flow rate of intake air that flows along the side of the second wall surface. Therefore, according to the aspect of the present invention, it is possible to adjust the degree of cooling of intake air with favorable responsiveness by performing an operation to open or close the tumble control valve.

According to the seventh aspect of the present invention, in a case where the engine operating region belongs to a first operating region in which strengthening of a tumble flow formed inside a cylinder is necessary, the tumble control valve is actuated to the closing side more than in a case where the engine operating region belongs to a second operating region that is an operating region other than the first operating region. The first operating region in which strengthening of a tumble flow is necessary is an operating region is which an air amount is small, and overlaps with an operating region in which intake air cooling is unnecessary. Further, the second operating region in which strengthening of a tumble flow is unnecessary is an operating region is which an air amount is large, and includes an operating region in which intake air cooling is necessary. Therefore, according to the aspect of the present invention, by actuating the tumble control valve in response to a request to strengthen a tumble flow, it is possible to satisfy an intake air cooling request and achieve a further improvement in a combustion state.

According to the eighth aspect of the present invention, an intake port is configured to include an inclined wall surface that inclines so as to progressively approach a central trajectory of the intake port in an intake-air downstream direction of the intake port. Further, the first wall surface is provided in the inclined wall surface. According to this configuration, the flow rate of intake air that flows along the side of the first wall surface can be decreased more effectively with respect to an actuation amount in a closing direction of the tumble control valve.

According to the ninth aspect of the present invention, in a case where intake air cooling is unnecessary and strengthening of a tumble flow is unnecessary, the tumble control valve is actuated to a predetermined intermediate degree of opening. When the tumble control valve is actuated to the predetermined intermediate degree of opening, a flow channel area can be secured while decreasing the flow rate of intake air that flows along the side of the first wall surface, and hence an improvement in combustion can be achieved by suppression of intake air cooling while suppressing an increase in pressure loss at the intake port.

DETAILED DESCRIPTION

Embodiments of the present invention are described hereunder with reference to the accompanying drawings. However, it is to be understood that even when the number, quantity, amount, range or other numerical attribute of an element is mentioned in the following description of the embodiments, the present invention is not limited to the mentioned numerical attribute unless it is expressly stated or theoretically defined. Further, structures or steps or the like described in conjunction with the following embodiments are not necessarily essential to the present invention unless expressly stated or theoretically defined.

First Embodiment

1. Configuration of Cooling Apparatus

An internal combustion engine of the present embodiment is a water-cooled engine (hereunder, referred to as simply "engine") that is cooled by cooling water. The cooling water for cooling the engine is circulated between the engine and a radiator by a cooling water circulation system (cooling water circulation circuit). The cooling water is supplied to both a cylinder block and a cylinder head that constitute the main body of the engine. The configuration of a cooling apparatus of the engine of the present embodiment is described hereunder.

Figure 1:
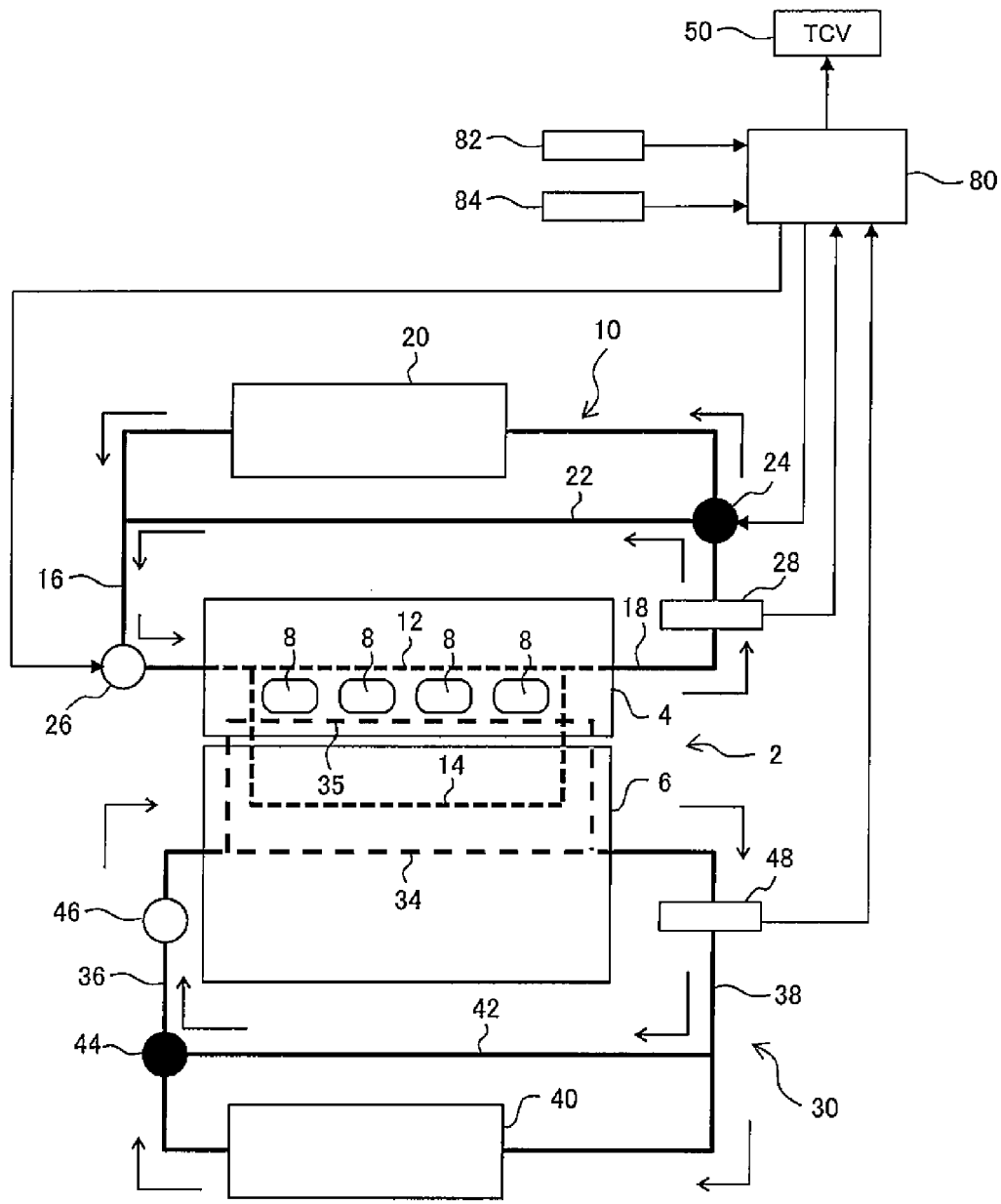
FIG. 1 is a view illustrating a configuration of a cooling apparatus of a first embodiment.

FIG. 1 is a view illustrating the configuration of the cooling apparatus of the present embodiment. The cooling apparatus of the present embodiment includes two cooling water circulation systems 10 and 30 that supply cooling water to an engine 2. Supply of cooling water is performed with respect to both of a cylinder block 6 and a cylinder head 4 of the engine 2. Each of the two cooling water circulation systems 10 and 30 is an independent closed loop, and the temperatures of the cooling water circulated through the respective circulation systems can be made to differ from each other. Hereunder, the cooling water circulation system 10 in which cooling water of a relatively low temperature circulates is referred to as "LT cooling water circulation system", and the cooling water circulation system 30 in which cooling water of a relatively high temperature circulates is referred to as "HT cooling water circulation system". Further, cooling water that circulates through the LT cooling water circulation system 10 is referred to as "LT cooling water", and cooling water that circulates through the HT cooling water circulation system 30 is referred to as "HT cooling water". Note that, "LT" is an abbreviation of "low temperature" and "HT" is an abbreviation of "high temperature".

The LT cooling water circulation system 10 includes an in-head LT cooling water channel 12 that is formed inside the cylinder head 4, and an in-block LT cooling water channel 14 that is formed inside the cylinder block 6. The in-head LT cooling water channel 12 is provided in the vicinity of an intake port 8. In FIG. 1, four intake ports 8 that are the intake ports for four cylinders are shown. The in-head LT cooling water channel 12 extends in the direction of a crankshaft of the engine 2, along the bottom surface of the intake ports 8 of the respective cylinders. The in-block LT cooling water channel 14 is provided so as to surround a portion in which a flow of intake air is particularly liable to collide against an upper portion of the respective cylinders. The sensitivity of the temperature of the intake port 8 and an intake valve and also a wall surface temperature of the upper portion of the cylinders with respect to knocking is high. Hence, by cooling the aforementioned parts in a concentrated manner by means of the in-head LT cooling water channel 12 and the in-block LT cooling water channel 14, the occurrence of knocking in a high-load region can be effectively suppressed. Note that, the in-head LT cooling water channel 12 and the in-block LT cooling water channel 14 are connected through openings formed in a mating surface between the cylinder head 4 and the cylinder block 6.

A cooling water inlet and a cooling water outlet that communicate with the in-head LT cooling water channel 12 are formed in the cylinder head 4. The cooling water inlet of the cylinder head 4 is connected to a cooling water outlet of an LT radiator 20 by a cooling water introduction pipe 16, and the cooling water outlet of the cylinder head 4 is connected to a cooling water inlet of the LT radiator 20 by a cooling water discharge pipe 18. The cooling water introduction pipe 16 and the cooling water discharge pipe 18 are connected by a bypass pipe 22 that bypasses the LT radiator 20. A three-way valve 24 is provided at a branching portion at which the bypass pipe 22 branches from the cooling water discharge pipe 18. An electric water pump 26 for circulating LT cooling water is provided downstream of a merging portion with the bypass pipe 22 in the cooling water introduction pipe 16. The discharge rate of the electric water pump 26 can be arbitrarily changed by adjusting the output of a motor. A temperature sensor 28 for measuring the temperature of LT cooling water (cooling water outlet temperature) that passes through the inside of the engine 2 is installed on the upstream side of the three-way valve 24 in the cooling water discharge pipe 18. In the present embodiment, the term "temperature of LT cooling water" refers to a cooling water outlet temperature that is measured by the temperature sensor 28.

The HT cooling water circulation system 30 includes an in-block HT cooling water channel 34 that is formed inside the cylinder block 6, and an in-head HT cooling water channel 35 that is formed inside the cylinder head 4. In contrast to the aforementioned in-block LT cooling water channel 14 that is a locally provided cooling water channel, the in-block HT cooling water channel 34 constitutes a major portion of a water jacket that surrounds the periphery of the cylinders. The in-head HT cooling water channel 35 is provided from the vicinity of exhaust ports to the vicinity of the intake ports. Note that, the in-head HT cooling water channel 35 and the in-block HT cooling water channel 34 are connected through openings formed in the mating surface between the cylinder head 4 and the cylinder block 6.

A cooling water inlet and a cooling water outlet that communicate with the in-block HT cooling water channel 34 are formed in the cylinder block 6. The cooling water inlet of the cylinder block 6 is connected to a cooling water outlet of a HT radiator 40 by a cooling water introduction pipe 36, and the cooling water outlet of the cylinder block 6 is connected to a cooling water inlet of the HT radiator 40 by a cooling water discharge pipe 38. The cooling water introduction pipe 36 and the cooling water discharge pipe 38 are connected by a bypass pipe 42 that bypasses the HT radiator 40. A thermostat 44 is provided at a merging portion at which the bypass pipe 42 merges with the cooling water introduction pipe 36. A mechanical water pump 46 for circulating HT cooling water is provided downstream of the thermostat 44 in the cooling water introduction pipe 36. The water pump 46 is connected through a belt to the crankshaft of the engine 2. A temperature sensor 48 for measuring the temperature of HT cooling water (cooling water outlet temperature) that passes through the inside of the engine 2 is installed upstream of a branching portion with the bypass pipe 42 in the cooling water discharge pipe 38. In the present embodiment, the term "temperature of HT cooling water" refers to a cooling water outlet temperature that is measured by the temperature sensor 48.

As described above, in the HT cooling water circulation system 30, because the water pump 46 is driven by the engine 2, HT cooling water is always circulating while the engine 2 is operating. The temperature of the cooling water circulating through the HT cooling water circulation system 30 is automatically regulated by the thermostat 44. On the other hand, in the LT cooling water circulation system 10, since the electric water pump 26 is used, LT cooling water can be circulated or caused to stop circulating regardless of whether or not the engine 2 is operating. Further, the flow rate of circulating LT cooling water can be controlled by means of a drive duty applied to the electric water pump 26. In addition, the temperature of LT cooling water circulating through the LT cooling water circulation system 10 can be actively adjusted by actuating the three-way valve 24 or the electric water pump 26.

Actuation of the three-way valve 24 and the electric water pump 26 of the LT cooling water circulation system 10 is performed by a control apparatus 80. The control apparatus 80 is a control apparatus of the cooling apparatus and at the same time is also a control apparatus that controls operation of the engine 2. The control apparatus 80 is configured to include as a main constituent an ECU (electronic control unit) that includes one or a plurality of CPUs and memories. The control apparatus 80 adjusts the temperature of the LT cooling water that flows through the in-head LT cooling water channel 12 or the in-block LT cooling water channel 14 to an appropriate temperature by actuating the electric water pump 26 to control the flow rate of the LT cooling water (hereunder, referred to as "LT flow rate"), and by actuating the three-way valve 24 to control the proportion of LT cooling water that bypasses the LT radiator 20.

Further, signals from an air flow meter 82 that measures an intake air flow rate and from a crank angle sensor 84 for acquiring an engine speed are input to the control apparatus 80 as signals of sensors for acquiring the operating state of the engine 2. The control apparatus 80 identifies the operating region of the engine 2 based on the inputted signals, and actuates actuators such as a tumble control valve (TCV) 50 for adjusting the strength of a tumble flow (vertical swirling flow) that is generated in a cylinder. The TCV 50 is described in detail later.

2. Configuration of Cooling Water Channels Formed in Cylinder Head

As shown in FIG. 1, the in-head LT cooling water channel 12 through which LT cooling water that has a low temperature flows and the in-head HT cooling water channel 35 through which HT cooling water that has a high temperature flows are formed in the cylinder head 4. Hereunder, the configurations of these cooling water channels are specifically described referring to a cross-sectional view of the cylinder head 4.

Figure 2:
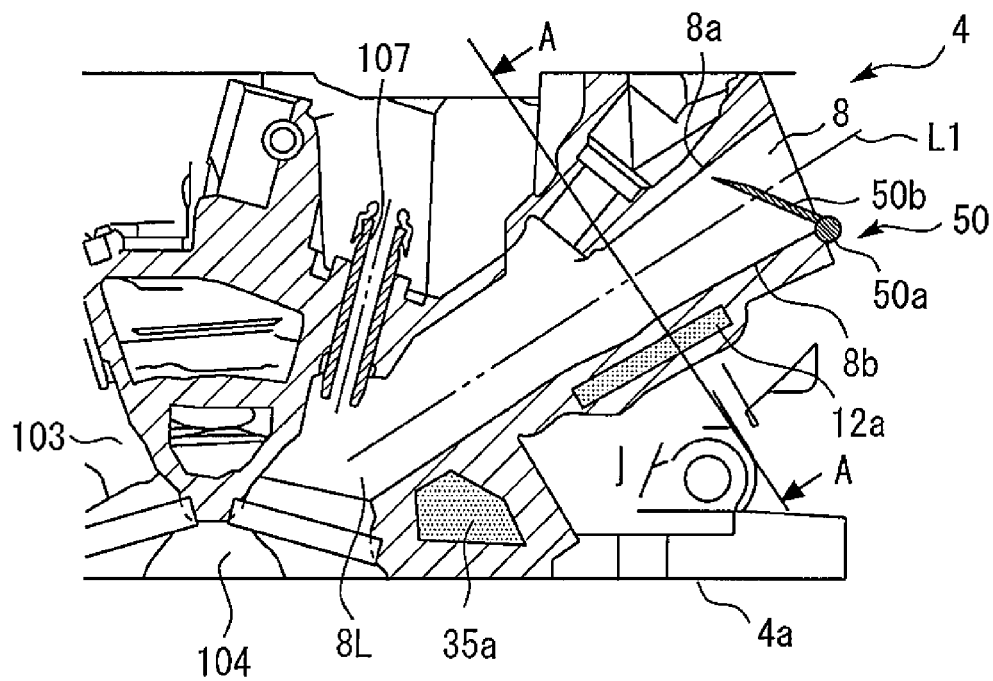
FIG. 2 is a cross-sectional view illustrating a cross section that is perpendicular to a longitudinal direction that includes a central axis of an intake valve insertion hole of a cylinder head of the first embodiment.

FIG. 2 is a cross-sectional view illustrating a cross section that is perpendicular to a longitudinal direction (direction of crankshaft) that includes a central axis of an intake valve insertion hole 107 of the cylinder head. However, in FIG. 2, an intake valve and an exhaust valve are illustrated in an abbreviated form. Note that, reference character L1 in FIG. 2 denotes a central trajectory of the intake port 8. The central trajectory L1 is defined as a line that passes through the center of a cross section obtained when the intake port 8 is cut perpendicularly to the direction of the flow channel thereof. Further, in the following description, a bottom surface of the cylinder head 4 that is mated with the cylinder block is referred to as "cylinder block mating surface 4a". In addition, among the wall surfaces of the intake port 8, a surface on an opposite side to the side of the cylinder block mating surface 4a with respect to the central trajectory L1 is referred to as "top surface 8a", and a surface on the side of the cylinder block mating surface 4a with respect to the central trajectory L1 is referred to as "bottom surface 8b".

A combustion chamber 104 having a pent-roof shape is formed in the cylinder block mating surface 4a. As viewed from the side of the front end of the cylinder head 4, the intake port 8 opens in an inclined face on a right side of the combustion chamber 104. A connecting portion between the intake port 8 and the combustion chamber 104, that is, an opening end on the combustion chamber side of the intake port 8, is an intake opening that is opened and closed by an intake valve which is not illustrated in the drawing. Since two intake valves are provided for each cylinder, two intake openings of the intake port 8 are formed in the combustion chamber 104. The intake port 8 extends in an approximately straight line towards the combustion chamber 104 from an inlet that opens in a side face of the cylinder head 4, and branches into two branch ports along the way, with each of the branch ports connecting to an intake opening formed in the combustion chamber 104. A branch port 8L on the side of the front end of the engine in the longitudinal direction is illustrated in FIG. 2.

The intake port 8 is a tumble flow generating port that can generate a tumble flow in the cylinder. The aforementioned TCV 50 is provided on the bottom surface 8b side in the intake port 8. More specifically, the TCV 50 has a rotary shaft 50a that is driven by an actuator, and a plate-shaped valve body 50b that is fixed to the rotary shaft 50a. The rotary shaft 50a is disposed on the bottom surface 8b side within the intake port 8 so as to extend in a direction that is parallel to the cylinder block mating surface 4a and is perpendicular to the central trajectory L1. When an operation to close the TCV 50 is performed, the valve body 50b is rotated around the rotary shaft 50a towards the inside of the intake port 8. As a result, the valve body 50b protrudes into the inside of the intake port 8, and hence a portion of the flow of intake air inside the intake port 8 is restricted.

An exhaust port 103 opens in an inclined face on a left side of the combustion chamber 104 as viewed from the side of the front end of the cylinder head 4. A connecting portion between the exhaust port 103 and the combustion chamber 104, that is, an opening end on the combustion chamber side of the exhaust port 103, is an exhaust opening that is opened and closed by an exhaust valve that is not illustrated in the drawing.

In the cross section shown in FIG. 2, a region denoted by reference character 35a is a partial cross section of the in-head HT cooling water channel 35 shown in FIG. 1. Hereunder, the term "in-head HT cooling water channel 35a" is used when referring to the region denoted by reference character 35a, for example. The in-head HT cooling water channel 35a is disposed between the bottom surface 8b of the intake port 8 and the cylinder block mating surface 4a.

Figure 3:
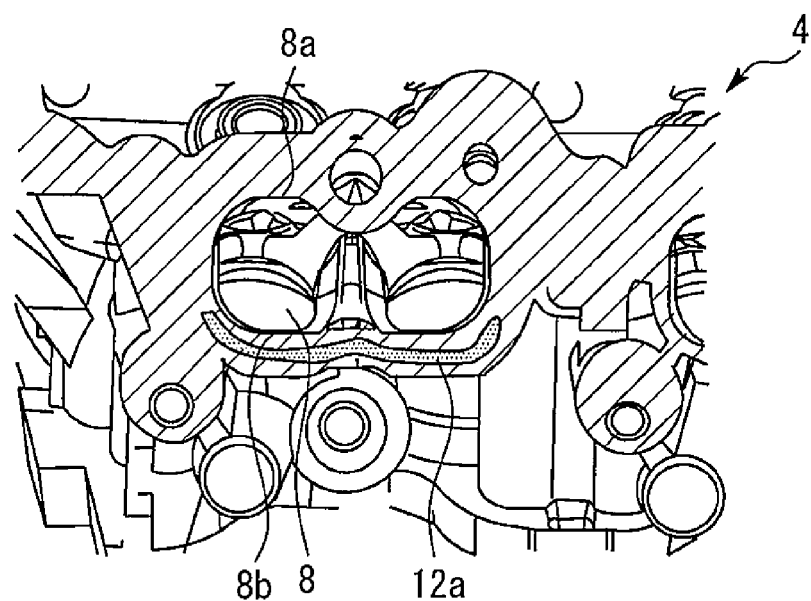
FIG. 3 is a cross-sectional view in which the cylinder head illustrated in FIG. 2 is cut along a cross section A-A that is perpendicular to a central trajectory L1.

In the cross section shown in FIG. 2, a region denoted by reference character 12a is a partial cross section of the in-head LT cooling water channel 12 shown in FIG. 1. FIG. 3 is a cross-sectional view in which the cylinder head illustrated in FIG. 2 is cut along a cross section A-A which is perpendicular to the central trajectory L1. As illustrated in these drawings, the in-head LT cooling water channel 12 extends along the bottom surface 8b of the intake port 8 of each cylinder in the longitudinal direction of the cylinder head 4. Hereunder, the term "first water jacket 12a" is used when referring to the region denoted by reference character 12a, for example. The water jacket 12a is provided on the intake-air downstream side of the TCV 50 so as cover a portion on the side of the bottom surface 8b of the intake port 8 with respect to at least any one cross section among cross sections that are perpendicular to the central trajectory L1, and does not extend around to the side of the top surface 8a. In the following description, an inner wall surface of the intake port 8 that is covered by the water jacket 12a is referred to as "cooled wall surface", and an inner wall surface of the intake port 8 that is not covered by the water jacket 12a is referred to as "non-cooled wall surface".

According to the above described configuration that is illustrated in FIG. 2, the cooled wall surface of the intake port 8 can be effectively cooled by the water jacket 12a for the intake port 8, through which the LT cooling water which has a lower temperature than the HT cooling water flows. By this means, intake air that flows through the intake port 8 can be efficiently cooled.

3. LT Flow Rate Control

Figure 4:
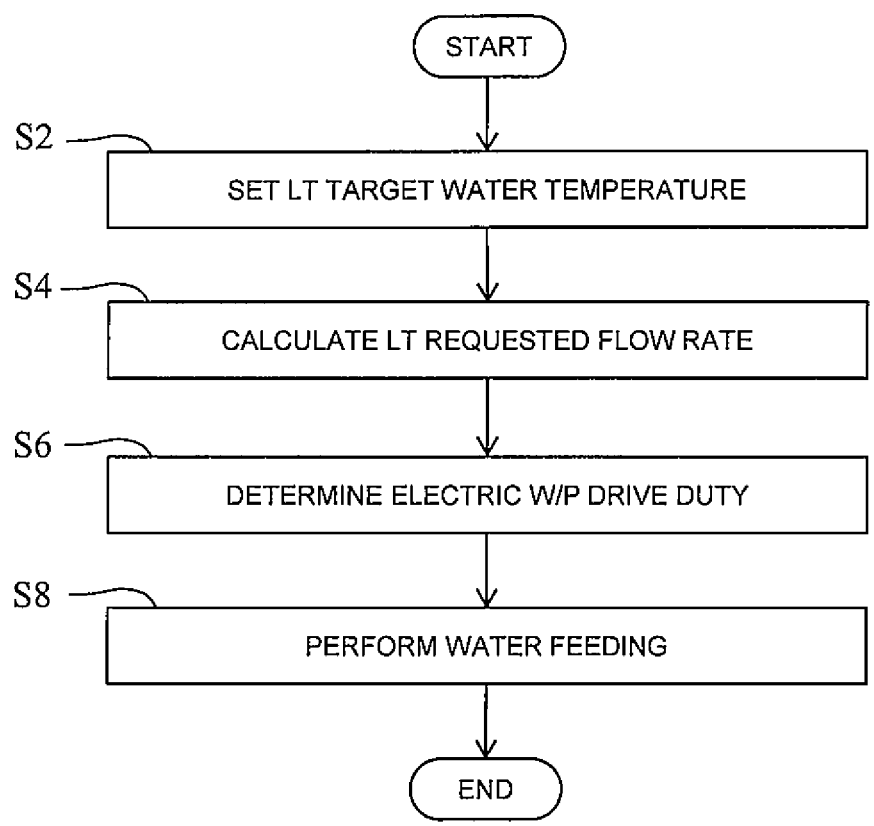
FIG. 4 is a flowchart illustrating a control flow of LT flow rate control.

The control apparatus 80 controls the LT flow rate to cool the principal portions of each of the cylinder head 4 and the cylinder block 6 to an appropriate temperature. FIG. 4 is a flowchart illustrating a control flow of LT flow rate control that is performed by the control apparatus 80. The control apparatus 80 repeatedly executes a routine represented by this control flow at predetermined control periods that correspond to the clock speed of the ECU.

First, the control apparatus 80 sets an LT target water temperature that is a target temperature of LT cooling water that flows through the in-head LT cooling water channel 12 and the in-block LT cooling water channel 14 (step S2).

Next, the control apparatus 80 calculates an LT requested flow rate that is a requested value of the LT flow rate based on the LT target water temperature determined in step S2 (step S4). More specifically, the control apparatus 80 refers to a previously prepared map in which the LT target water temperature and the LT requested flow rate are associated, and calculates a feedforward term of the LT requested flow rate, and also calculates a feedback term of the LT requested flow rate based on a difference between the LT target water temperature and a current temperature (outlet temperature) of the LT cooling water that is measured by the temperature sensor 28.

Next, the control apparatus 80 determines a drive duty of the electric water pump 26 based on the LT requested flow rate determined in step S4 (step S6). However, if a valve that adjusts the LT flow rate is provided inside the LT cooling water circulation system 10, the LT flow rate can also be adjusted by actuating the valve to adjust the degree of opening thereof.

Finally, the control apparatus 80 actuates the electric water pump 26 in accordance with the drive duty that is determined in step S6 to thereby cause LT cooling water to flow through the in-head LT cooling water channel 12 and the in-block LT cooling water channel 14 (step S8). By this means, the LT flow rate changes and the principal portions of each of the cylinder head 4 and the cylinder block 6 are cooled to an appropriate temperature.

4. Intake Air Cooling Control Using TCV

As described above, the TCV 50 is a component for adjusting the strength of a tumble flow that is generated inside a cylinder. More specifically, when the TCV 50 is closed, the flow of intake air on the bottom surface 8b side of the intake port 8 is restricted. By this means, an air flow that flows into the cylinder along the top surface 8a of the intake port 8 is strengthened, and hence a tumble flow that is generated inside the cylinder is strengthened. Note that, at such time, if the TCV 50 is simply closed, the flow rate of air that flows into the cylinder will decrease. Therefore, when closing the TCV 50, an operation to open a throttle is performed in accompaniment therewith.

Figure 5:
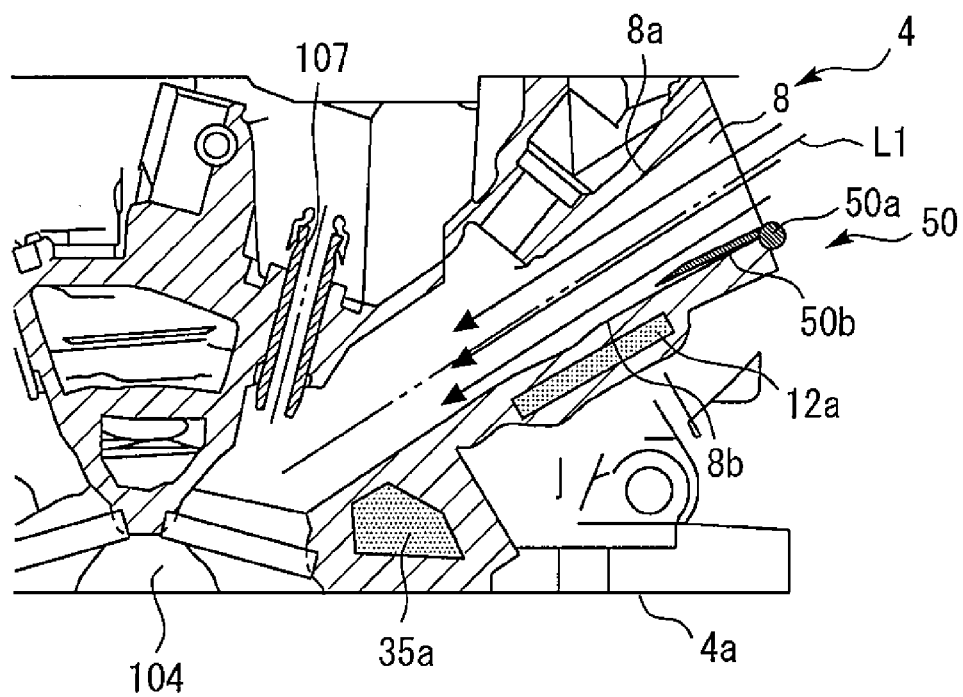
FIG. 5 is a view that schematically illustrates an intake air flow inside an intake port in a state in which a TCV is open.
Figure 6:
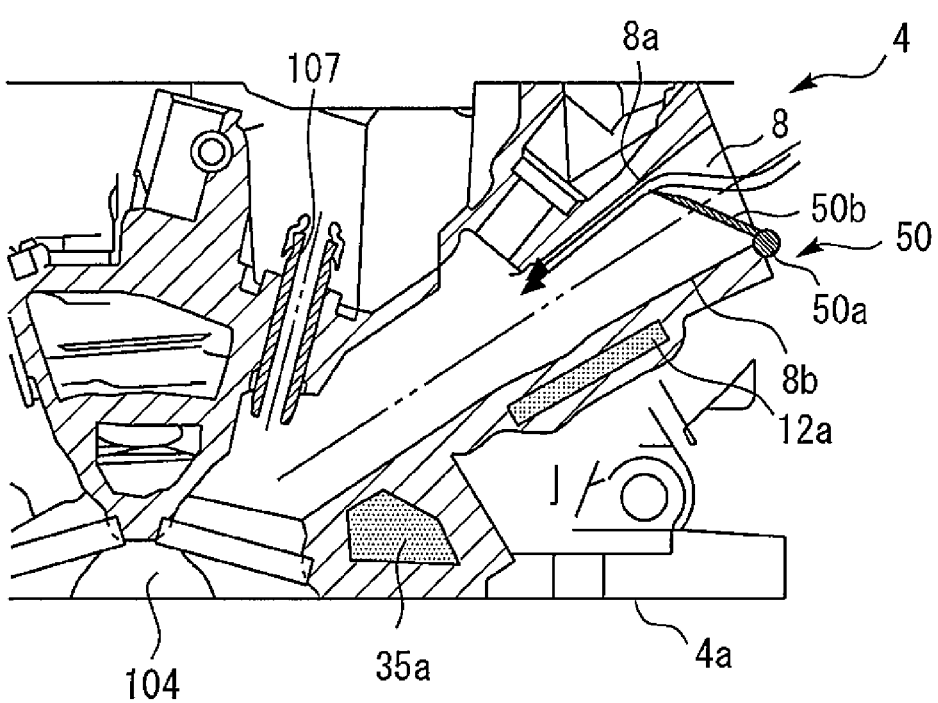
FIG. 6 is a view that schematically illustrates an intake air flow inside an intake port in a state in which a TCV is closed.

In this case, when the TCV 50 is actuated, the flow rate of intake air that flows along the cooled wall surface at which the water jacket 12a is provided changes. FIG. 5 is a view that schematically illustrates an intake air flow inside the intake port in a state in which the TCV is opened. FIG. 6 is a view that schematically illustrates an intake air flow inside the intake port in a state in which the TCV is closed. As shown in FIG. 5, in a state in which the TCV 50 is opened, intake air flows through the inside of the intake port 8 along the central trajectory L1 of the intake port 8.

In contrast, as shown in FIG. 6, in a state in which the TCV 50 is closed, on the intake-air downstream side of the TCV 50, a deviation is generated between the respective intake air flow rates (mass flow rates) on the top surface 8a side and the bottom surface 8b side inside the intake port 8. More specifically, the deviation is generated in a form such that the flow rate on the bottom surface 8b side inside the intake port 8 (that is, the cooled wall surface at which the water jacket 12a is provided) becomes less than the flow rate on the top surface 8a side (that is, the non-cooled wall surface at which the water jacket 12a is not provided).

In other words, the TCV 50 functions as an airflow control valve that, by adjustment of the degree of opening thereof, can change a ratio between a flow rate of intake air that flows on the side of the cooled wall surface and a flow rate of intake air that flows on the side of the non-cooled wall surface. When the flow rate of intake air that flows along the cooled wall surface at which the water jacket 12a is provided decreases, the intake air cooling capacity also decreases by a corresponding amount. Accordingly, when the TCV 50 is actuated from a closed state to an open state, the flow rate of intake air that flows along the cooled wall surface at which the water jacket 12a is provided increases, and the intake air cooling capacity rises. Thus, according to the apparatus of the present embodiment, by actuating the TCV 50 which can be actuated with favorable responsiveness, it is possible to change the intake air cooling capacity with favorable responsiveness.

Figure 7:
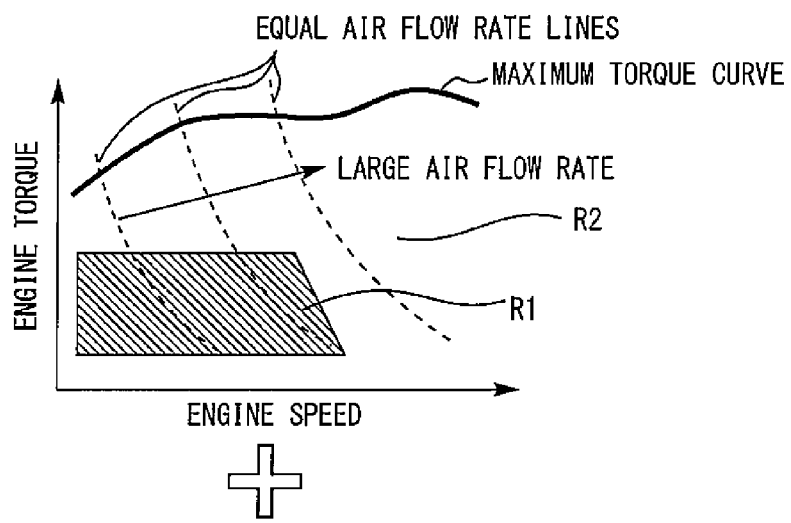
FIG. 7 is a multiple view drawing for describing requests with respect to respective operating regions of an engine.
Figure 7:
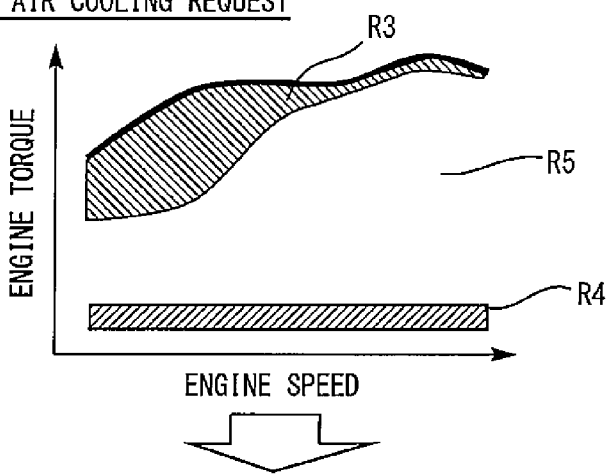
Figure 7:
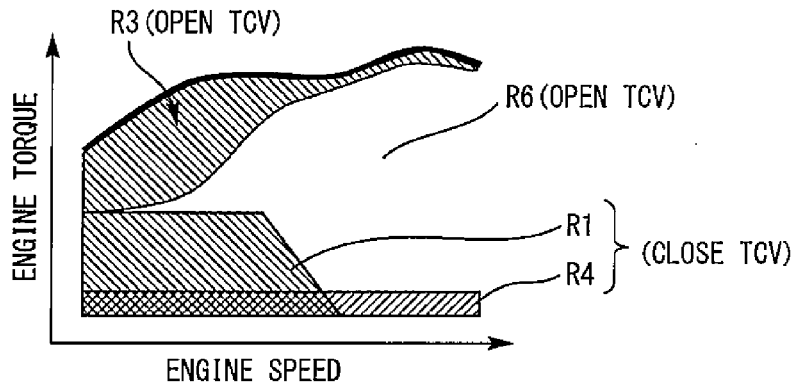

While the TCV 50 can be used for the purpose of changing the intake air cooling capacity in this manner, it is also necessary for the TCV 50 to fulfill the original intended use thereof, which is to strengthen the tumble flow. In this respect, a tumble flow strengthening request and an intake air cooling request change depending on the operating region of the engine 2. FIG. 7 is a multiple view drawing for describing requests with respect to respective operating regions of the engine 2. Note that, the operating regions illustrated in FIG. 7 are defined by the engine torque and the engine speed. For example, engines in which operation is performed under a theoretical air-fuel ratio, including the engine 2, correspond to engines in which the requests described hereunder are issued.

FIG. 7A is a view that illustrates engine operating regions from the viewpoint of a request to strengthen a tumble flow. A region R1 that is indicated by hatching in FIG. 7A represents an operating region in which there is a request to strengthen a tumble flow (that is, a request to close the TCV 50). The region R1 is a low-to-medium speed and low-to-medium load region in which the flow velocity of intake air is not sufficiently high because the intake air flow rate is not high. In the region R1, it is necessary to strengthen the tumble flow in order to improve the combustion efficiency and combustion stability by strengthening the turbulence of gas in the cylinder.

On the other hand, a region R2 in which there is no hatching in FIG. 7A is an operating region on a higher speed or higher load side compared to the region R1. In the region R2, because the air flow rate is greater than in the region R1, it is unnecessary to strengthen the tumble flow, and conversely, it is necessary to open the TCV 50 to reduce intake air resistance.

FIG. 7B is a view that illustrates engine operating regions from the viewpoint of an intake air cooling request. Regions that are indicated by hatching in FIG. 7B represent operating regions in which there is an intake air cooling request. These regions are a region R3 and a region R4. The region R3 is an operating region on a high load side in which the occurrence of knocking is a concern (in particular, a low-speed and high-load region). In the region R3, intake air cooling is necessary to suppress the occurrence of knocking. The region R4 corresponds to an operating region in which, in order to ensure combustion stability, intake air cooling is not possible. On the other hand, a region R5 in which there is no hatching in FIG. 7B is a non-knocking region and is thus an operating region in which intake air cooling is unnecessary (more specifically, a region in which whether intake air cooling is necessary or not is irrelevant).

FIG. 7C is a view that illustrates engine operating regions obtained by superimposing the respective regions shown in FIG. 7A and the respective regions shown in FIG. 7B. When consideration is given to both a tumble flow strengthening request and an intake air cooling request, the following facts are found. That is, first, as shown in FIG. 7C, it is found that there is an overlapping portion between the region R1 in which there is a request to strengthen the tumble flow and the region R4 in which, in order to ensure combustion stability, intake air cooling is not possible. With regard to these regions R1 and R4, according to the configuration of the present embodiment, both a tumble flow strengthening request and a request that makes intake air cooling unnecessary or not possible are satisfied by closing the TCV 50.

Further, as shown in FIG. 7C, it is found that the regions R1 and R4 in which it is preferable to close the TCV 50 and the region R3 in which strengthening of a tumble flow is unnecessary (that is, it is preferable for the TCV 50 to be open) and intake air cooling is necessary do not overlap. Further, a region R6 shown in FIG. 7C is an operating region other than the regions R1, R3 and R4, and is an operating region in which strengthening of a tumble flow is unnecessary (that is, it is preferable for the TCV 50 to be open) and intake air cooling is also unnecessary (more specifically, a region in which whether intake air cooling is necessary or not is irrelevant).

Based on the foregoing it can be said that the requests for the respective regions shown in FIG. 7C can be satisfied by closing the TCV 50 in the regions R1 and R4 and opening the TCV 50 in the regions R3 and R6. The control apparatus 80 is configured to open and close the TCV 50 in the above described manner based on the engine operating region. Note that, acquisition of the current operating region for determining a control position of the TCV 50 can be performed, for example, using an engine torque that is calculated based on an intake air flow rate that is measured by the air flow meter 82 and an engine speed that is calculated based on a detection value of the crank angle sensor 84.

The engine operating region continuously changes while the engine is operating. Consequently, the situation with respect to the existence/non-existence of a tumble flow strengthening request and the existence/non-existence of an intake air cooling request can change frequently while the engine is operating. With respect to a change regarding the existence/non-existence of a tumble flow strengthening request, it can be said that it is possible to quickly respond to such a change by controlling the TCV 50. However, with respect to a change regarding the existence/non-existence of an intake air cooling request, if it is attempted to respond to such a request by changing the LT target water temperature, a response delay will be a problem. If the temperature of intake air cannot be controlled with favorable responsiveness when the operating region transiently changes, for example, it is necessary to set the ignition timing to a retardation side to suppress the occurrence of knocking. This causes a deterioration in the fuel consumption of the engine, and also causes the engine torque to decrease at a time of acceleration and increases the time required for acceleration.

In this respect, according to the configuration of the present embodiment, in a state in which the TCV 50 is open, intake air that is cooled by the water jacket 12a can be supplied into the combustion chamber 104 while ensuring not to strengthen the tumble flow. On the other hand, in a state in which the TCV 50 is closed, the tumble flow can be strengthened by mainly utilizing intake air that is not cooled by the water jacket 12a, and it is also possible to satisfy a request that disables the performance of intake air cooling. Thus, according to the present configuration, frequent changes regarding the existence/non-existence of an intake air cooling request can be responded to with favorable responsiveness without relying on adjustment of the temperature of the LT cooling water. Consequently, even when the operating region is transiently changing, for example, since combustion can be made more suitable by suppressing retardation of the ignition timing, an improvement in fuel consumption and shortening of an acceleration time can be achieved.

5. Specific Processing of Intake Air Cooling Control Using TCV

Figure 8:
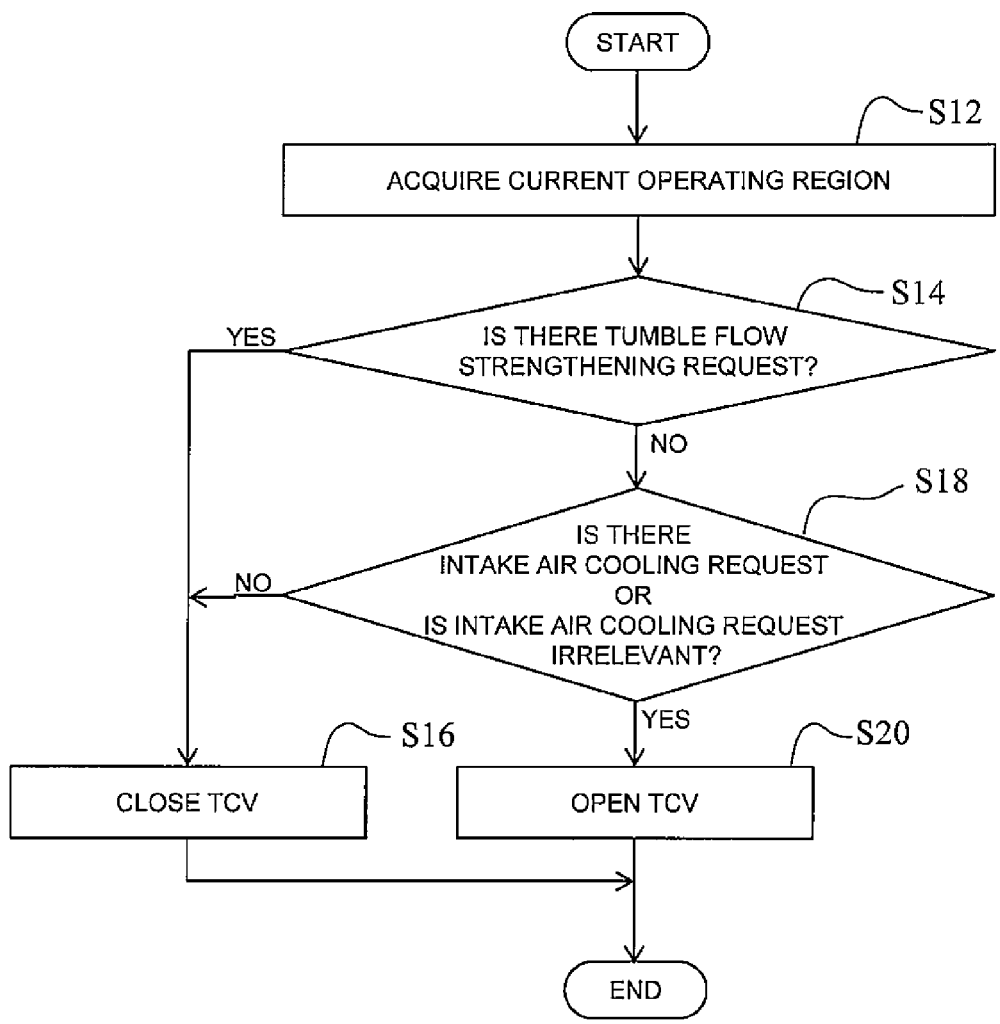
FIG. 8 is a flowchart illustrating a control flow of intake air cooling control of the first embodiment.

Next, specific processing of the intake air cooling control using the TCV 50 will be described referring to a flowchart. The control apparatus 80 controls the degree of opening of the TCV 50 to cool intake air that passes through the intake port 8. FIG. 8 is a flowchart illustrating a control flow of the intake air cooling control that is performed by the control apparatus 80. The control apparatus 80 repeatedly executes a routine represented by this control flow at predetermined control periods that correspond to the clock speed of the ECU.

In the routine illustrated in FIG. 8, first, the current operating region is acquired by means of an engine torque that is calculated based on an intake air flow rate that is measured by the air flow meter 82, and the engine speed that is calculated based on a detection value of the crank angle sensor 84 (step S12). Next, it is determined whether or not there is a tumble flow strengthening request (step S14). Here, specifically, it is determined whether the current operating region that is acquired in the aforementioned step S12 belongs to either of the region R1 and the region R2 that are illustrated in FIG. 7A. If it is determined as a result that the current operating region belongs to the region R1, it is determined that there is a tumble flow strengthening request, and the operation moves to the next step to close the TCV 50 (step S16).

On the other hand, in the aforementioned step S14, if the current operating region belongs to the region R2, it is determined that there is not a tumble flow strengthening request, and the operation moves to the next step to determine whether or not there is an intake air cooling request (step S18). In this case, specifically, it is determined whether or not the current operating region acquired in the aforementioned step S12 belongs to any of the region R3, the region R4 and the region R5 that are illustrated in FIG. 7B. If it is determined as a result that the current operating region belongs to the region R3 or the region R5, it is determined that there is an intake air cooling request or that whether or not there is an intake air cooling request is irrelevant, and the operation moves to the next step to open the TCV 50 (step S20). In contrast, in the aforementioned step S18, if it is determined that the current operating region belongs to the region R4, it is determined that there is not an intake air cooling request, and the operation moves to the aforementioned step S16 in which the TCV 50 is closed.

Thus, according to the control apparatus of the present embodiment, it is possible to respond with favorable responsiveness to a tumble flow strengthening request and an intake air cooling request with respect to the engine 2.

Note that, the region R3 shown in FIG. 7B is included in the region R2 shown in FIG. 7A. Further, the region R4 shown in FIG. 7B is included in the region R1 shown in FIG. 7A excluding a partial region of a high speed and a low load of the region R4. The high-speed and low-load region of region R4 that is not included in the region R1 is an operating region that can be reached under limited conditions, and this region rarely belongs to regions relating to a normal operating state. Based on the foregoing, it can be said that if the TCV 50 is controlled so as to satisfy a tumble flow strengthening request that is illustrated in FIG. 7A, a large portion of the intake air cooling requests illustrated in FIG. 7B can be satisfied without conflicting with satisfaction of the tumble flow strengthening request. Therefore, according to the routine illustrated in the aforementioned FIG. 8, a configuration may also be adopted in which the determination regarding an intake air cooling request in step S18 is not performed. In this case, it is sufficient to perform a determination regarding the existence/non-existence of a tumble flow strengthening request in step S14, and to close the TCV 50 in a case where there is a tumble flow strengthening request (that is, when the current operating region belongs to the region R1), or to open the TCV 50 in a case where there is not a tumble flow strengthening request (that is, when the current operating region belongs to the region R2). By this control also, it is possible to satisfy an intake air cooling request with favorable responsiveness while also satisfying a tumble flow strengthening request.

6. Modifications

Note that the present invention is not limited to the above described embodiment, and various modifications can be made without departing from the spirit and scope of the present invention. For example, the modifications described hereunder may be made.

Figure 9:
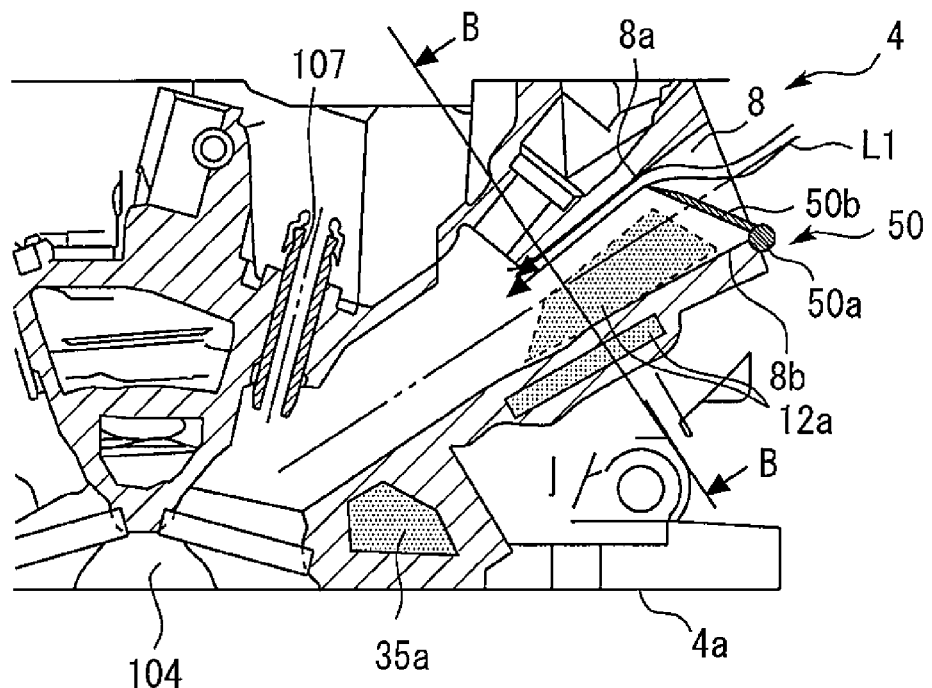
FIG. 9 is a cross-sectional view for describing a configuration of a water jacket as a modification.
Figure 10:
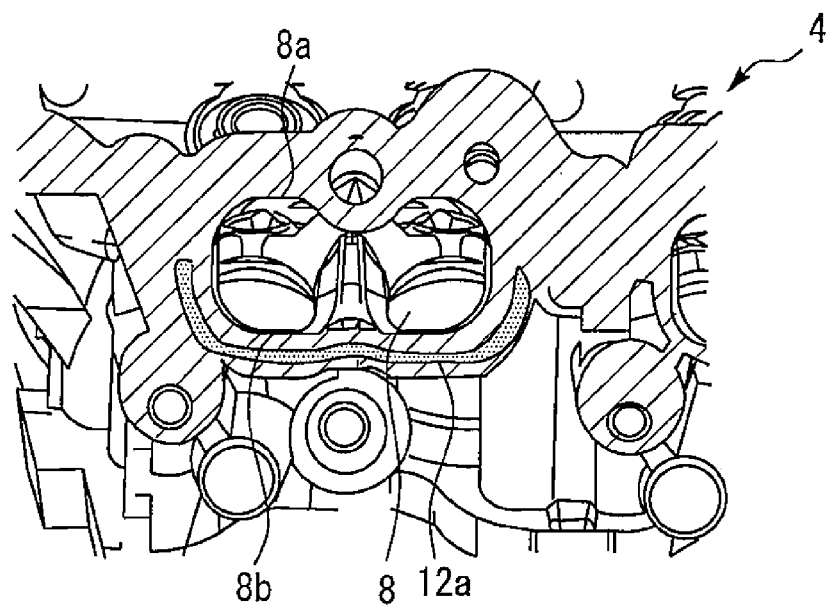
FIG. 10 is a cross-sectional view in which a cylinder head illustrated in FIG. 9 is cut along a cross section B-B that is perpendicular to the central trajectory L1.

In the above described first embodiment, the water jacket 12a is provided so as to cover a portion of the bottom surface 8b of the intake port 8 on an intake-air downstream side of the TCV 50. However, the configuration of the water jacket 12a is not limited thereto, and a configuration may also be adopted in which the water jacket 12a further covers an area as far as side faces of the intake port 8. FIG. 9 is a cross-sectional view for describing the configuration of a water jacket as a modification, and illustrates a cross section that is perpendicular to a longitudinal direction (direction of the crankshaft) including a central axis of an intake valve insertion hole of a cylinder head. Further, FIG. 10 is a cross-sectional view in which the cylinder head illustrated in FIG. 9 is cut along a cross section B-B that is perpendicular to the central trajectory L1. In the example illustrated in these drawings, the water jacket 12a is configured so as to cover an area as far as the side walls on the bottom surface 8b side of the intake port 8 on the intake-air downstream side of the TCV 50. According to this configuration the cooling capacity in a case where the TCV 50 is opened can be further increased, and it is thus possible to further improve the response performance with respect to an intake air cooling request.

Figure 11:
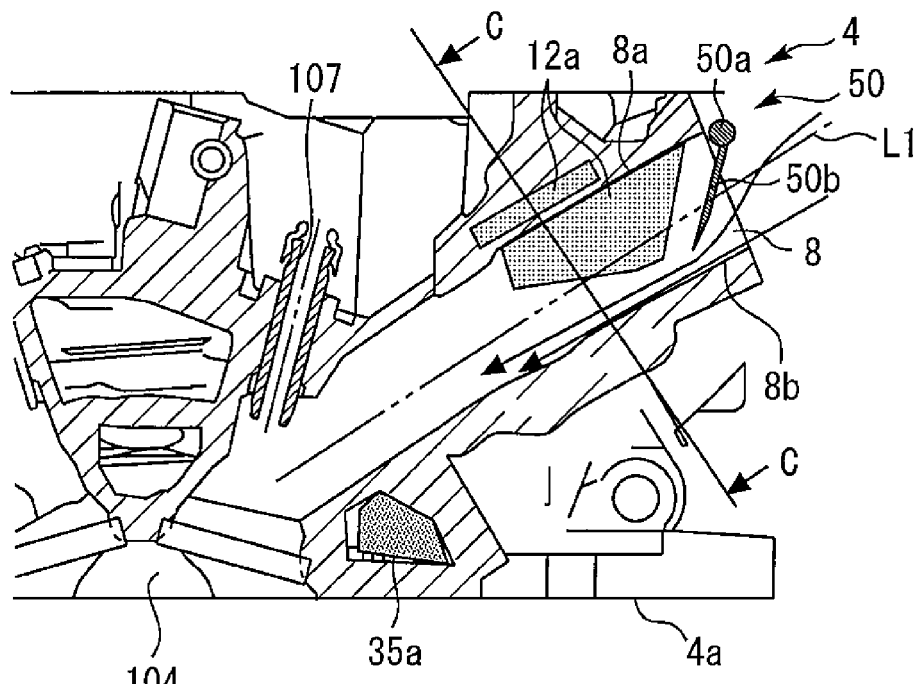
FIG. 11 is a cross-sectional view for describing a configuration of a TCV and a water jacket as a modification.
Figure 12:
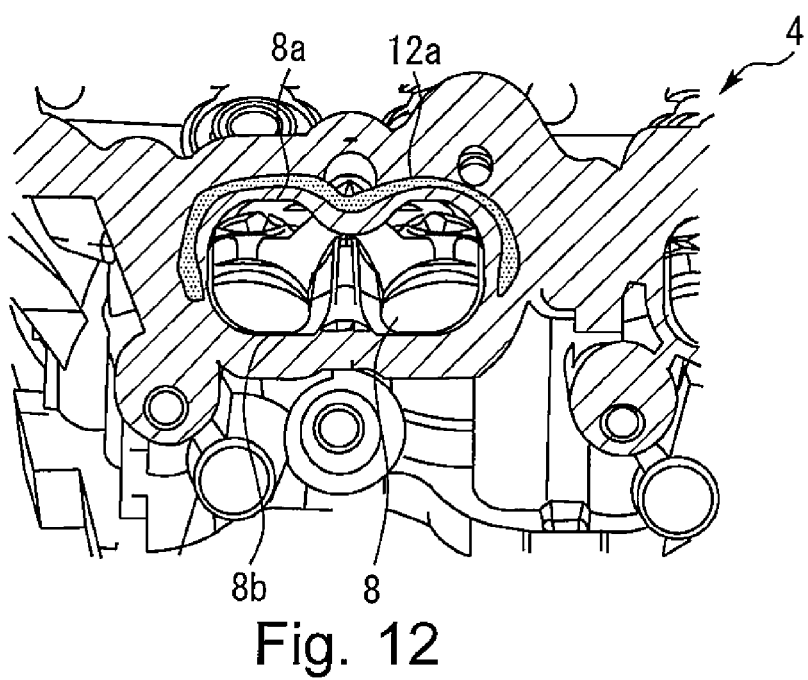
FIG. 12 is a cross-sectional view in which a cylinder head illustrated in FIG. 11 is cut along a cross section C-C that is perpendicular to the central trajectory L1.

Further, in the above described first embodiment, a configuration is described in which the TCV 50 and the water jacket 12a are provided on the bottom surface 8b side of the intake port 8. However, the arrangement of the TCV 50 and the water jacket 12a is not limited thereto, and the TCV 50 and the water jacket 12a may be provided on the top surface 8a side of the intake port 8. FIG. 11 is a cross-sectional view for describing a configuration of the TCV and the water jacket as a modification, and illustrates a cross section that is perpendicular to a longitudinal direction (direction of the crankshaft) including a central axis of an intake valve insertion hole of a cylinder head. Further, FIG. 12 is a cross-sectional view in which the cylinder head illustrated in FIG. 11 is cut along a cross section C-C that is perpendicular to the central trajectory L1. In the example illustrated in these drawings, the TCV 50 is provided on the top surface 8a side of the intake port 8, and the water jacket 12a is configured so as to cover an area as far as side walls on the top surface 8a side of the intake port 8 on the intake-air downstream side of the TCV 50. According to this configuration also, the response performance with respect to an intake air cooling request can be improved using the TCV 50. Note that, although in the example illustrated in FIG. 11 and FIG. 12 the water jacket 12a is configured to cover an area as far as the side walls on the top surface 8a side of the intake port 8 on the intake-air downstream side of the TCV 50, it is sufficient to provide the water jacket 12a so as to cover a portion of the top surface 8a of the intake port 8 at least at any one cross section among cross sections that are perpendicular to the central trajectory L1 on the intake-air downstream side of the TCV 50.

Figure 13:
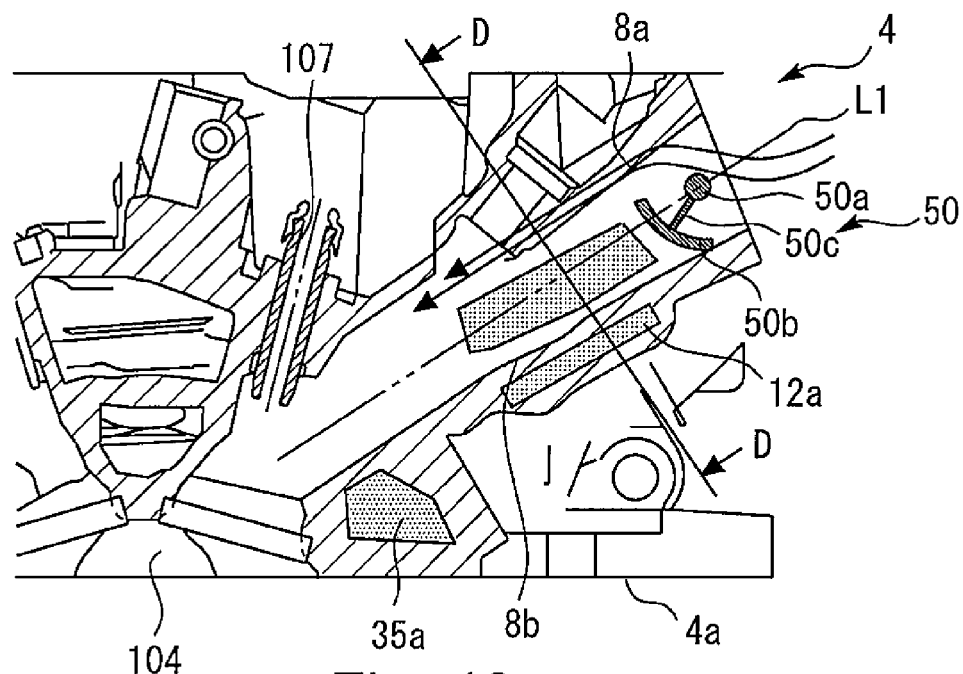
FIG. 13 is a cross-sectional view for describing a configuration of a TCV and a water jacket as a modification.

Further, FIG. 13 is a cross-sectional view for describing a configuration of the TCV and the water jacket as a modification, and illustrates a cross section that is perpendicular to the longitudinal direction (direction of the crankshaft) including the central axis of the intake valve insertion hole of the cylinder head. Note that, since the configuration of principal portions at a cross section that is obtained when the cylinder head illustrated in FIG. 13 is cut along a cross section D-D that is perpendicular to the central trajectory L1 is the same as in the above described FIG. 10, FIG. 10 will be referred to as appropriate. In the example illustrated in these drawings, the TCV 50 is constituted by a rotary shaft 50a that is driven by an actuator, a plate-shaped valve body 50b, and a support shaft 50c that fixes the valve body 50b to the rotary shaft 50a. The rotary shaft 50a is a shaft that extends from an inner wall surface of the intake port 8 to a facing inner wall surface, and is parallel to the cylinder block mating surface 4a and arranged so as to extend in a direction that is perpendicular to the central trajectory L1. The support shaft 50c is connected so as to extend in a perpendicular direction from partway along the rotary shaft 50a. The valve body 50b is provided at a distal end portion of the support shaft 50c so as to extend in a direction perpendicular to the support shaft 50c. The valve body 50b has a circular arc shape at a cross section that is perpendicular to the longitudinal direction including the central axis of the intake valve insertion hole of the cylinder head. Further, the water jacket 12a is configured so as to cover an area as far as the side walls on the bottom surface 8b side of the intake port 8 on the intake-air downstream side of the TCV 50.

When the TCV 50 configured in this manner as illustrated in FIG. 13 is opened, the rotary shaft 50a is rotationally driven and the valve body 50b moves to a position along the bottom surface 8b side of the intake port 8. As a result, intake air flows from the intake-air upstream side of the TCV 50 to the intake-air downstream side thereof without being restricted in any way by the valve body 50b. On the other hand, when the TCV 50 illustrated in FIG. 13 is closed, the rotary shaft 50a is rotationally driven and the valve body 50b moves to a position at which the valve body 50b blocks the bottom surface 8b side of the intake port 8. As a result, intake air passes through the top surface 8a side of the intake port 8 that is above the valve body 50b and flows to the intake-air downstream side. According to this configuration also, since closing the TCV 50 causes a deviation to be generated between an intake air flow rate on the top surface 8a side of the intake port 8 that is not covered by the water jacket 12a and an intake air flow rate on the bottom surface 8b side that is covered by the water jacket 12a, intake air cooling control using the TCV 50 is possible.

Note that, although in the example illustrated in FIG. 13 the water jacket 12a is configured to cover an area as far as the side walls on the bottom surface 8b side of the intake port 8 on the intake-air downstream side of the TCV 50, it is sufficient to provide the water jacket 12a so as to cover a portion of the bottom surface 8b of the intake port 8 at least at any one cross section among cross sections that are perpendicular to the central trajectory L1 on the intake-air downstream side of the TCV 50.

Further, although in the above described first embodiment a configuration is adopted in which intake air cooling control is performed using the TCV 50, another airflow control valve that does not contribute to strengthening of a tumble flow may be used as long as the valve is capable of generating a deviation between intake air flow rates on a side that is not covered by the water jacket 12a and a side that is covered by the water jacket 12a by driving the valve body on the intake-air upstream side of the water jacket 12a.

Note that, in the control apparatus of the first embodiment that is described above, the LT cooling water circulation system 10 corresponds to "low-temperature cooling water circulation system" of the first invention, the in-head LT cooling water channel 12 corresponds to "low-temperature cooling water channel" of the first invention, the HT cooling water circulation system 30 corresponds to "high-temperature cooling water circulation system" of the first invention, the in-head HT cooling water channel 35 corresponds to "high-temperature cooling water channel" of the first invention, the water jacket 12a corresponds to "water jacket" of the first invention, the cooled wall surface corresponds to "first wall surface" of the first invention, the non-cooled wall surface corresponds to "second wall surface" of the first invention, and the TCV 50 corresponds to "airflow control valve" of the first invention.

Further, in the control apparatus of the first embodiment that is described above, the control apparatus 80 corresponds to "control apparatus" of the second invention, the region R3 corresponds to "intake-air-cooling necessary region" of the second invention, and the region R4 or region R5 corresponds to "intake-air-cooling unnecessary region" of the second invention.

Furthermore, in the control apparatus of the first embodiment that is described above, the control apparatus 80 corresponds to "control apparatus" of the seventh invention, the region R1 corresponds to "first operating region" of the seventh invention, and the region R2 corresponds to "second operating region" of the seventh invention.

Second Embodiment

1. Configuration of Cooling Water Channels Formed in Cylinder Head

Next, a second embodiment of the present invention will be described using the drawings. The basic configuration of an engine of the second embodiment is the same as that of the engine of the first embodiment except with respect to the intake port shape and the arrangement of the water jacket as described later. Therefore, with respect to the other basic configuration of the engine of the second embodiment excluding the aforementioned differences, the description of the basic configuration of engine of the first embodiment is incorporated as it is into the description of the second embodiment and a duplicate description thereof is not provided here. Hereunder, the characteristic configuration of the engine of the second embodiment is described. The following description is made using cross-sectional views that are perpendicular to the longitudinal direction that includes the central axis of the intake valve insertion hole 107, similarly to FIG. 2. Further, in each of the drawings, elements that are common with elements of the first embodiment are denoted by the same reference characters.

Figure 14:
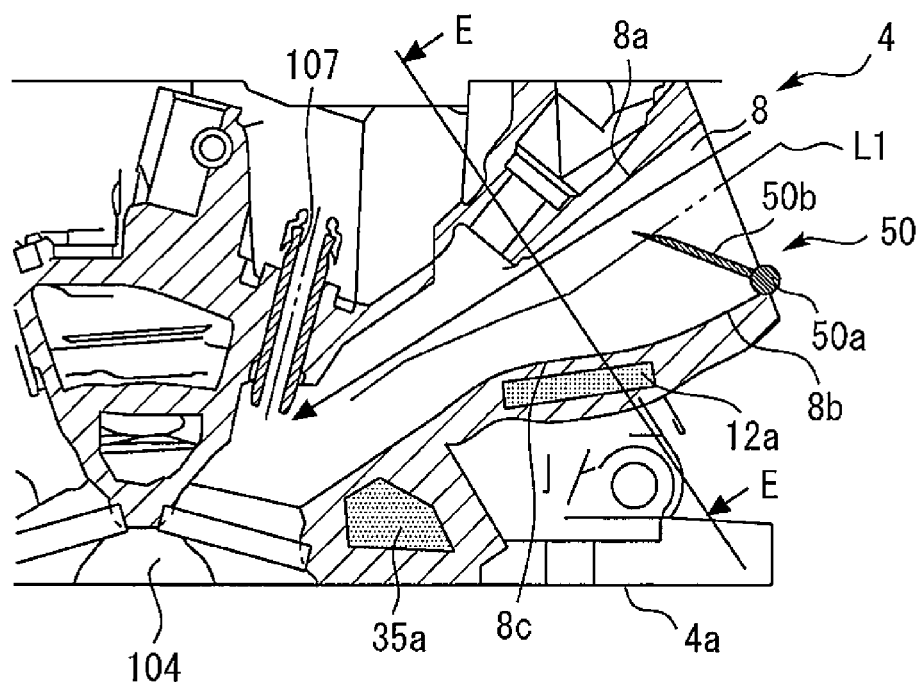
FIG. 14 is a cross-sectional view illustrating a cross section that is perpendicular to a longitudinal direction that includes a central axis of an intake valve insertion hole of a cylinder head of a second embodiment.

FIG. 14 is a cross-sectional view illustrating a cross section that is perpendicular to the longitudinal direction (direction of crankshaft) including the central axis of the intake valve insertion hole of a cylinder head. Note that, since the configuration of principal portions at a cross section that is obtained when the cylinder head illustrated in FIG. 14 is cut along a cross section E-E that is perpendicular to the central trajectory L1 is the same as in the above described FIG. 10, FIG. 10 will be referred to as appropriate.

The intake port 8 is a tumble flow generating port that can generate a tumble flow in the cylinder. The TCV 50 is provided on the bottom surface 8b side inside the intake port 8. An inclined wall surface 8c that is inclined so as to progressively approach the central trajectory L1 from the intake air upstream direction towards the intake-air downstream direction is provided on a side of the bottom surface 8b that is located on the intake-air downstream side of the TCV 50 of the intake port 8. The water jacket 12a is provided so as to cover one portion of the inclined wall surface 8c at least at any one cross section among cross sections that are perpendicular to the central trajectory L1.

2. Intake Air Cooling Control Using TCV

Figure 15:
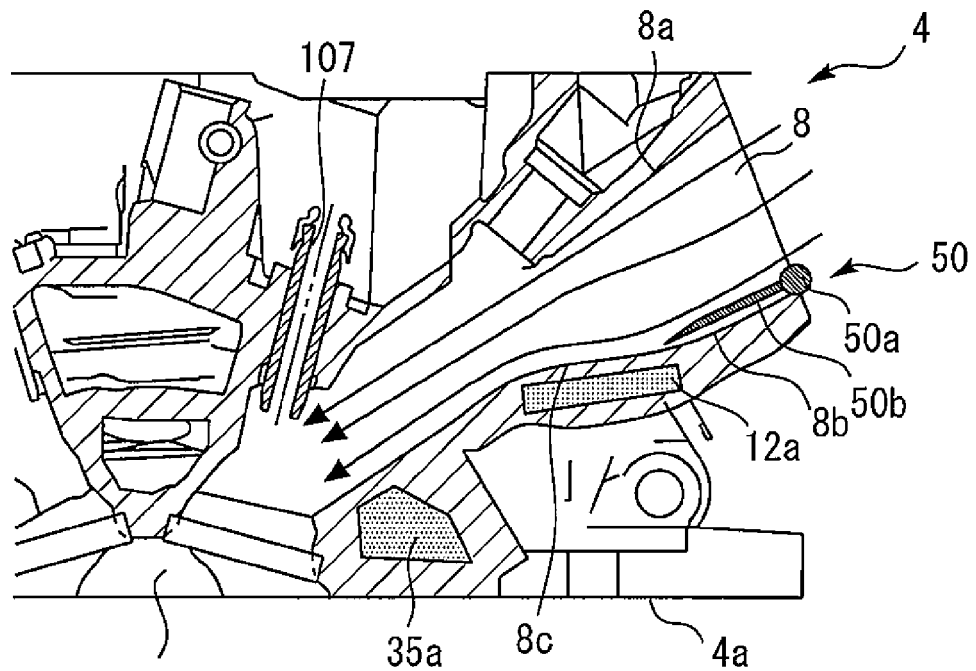
FIG. 15 is a view that schematically illustrates an intake air flow inside an intake port in a state in which a TCV is fully open.

As described above, the TCV 50 is a component for adjusting the strength of a tumble flow that is generated inside a cylinder. When the TCV 50 is driven, the flow rate of intake air that flows along the cooled wall surface at which the water jacket 12a is provided changes. The aforementioned FIG. 14 schematically illustrates an intake air flow inside the intake port in a state in which the TCV is closed. Further, FIG. 15 is a view that schematically illustrates an intake air flow inside the intake port in a state in which the TCV is opened fully. In addition, FIG. 16 is a view that schematically illustrates an intake air flow inside the intake port in a state in which the TCV is opened to an intermediate degree of opening.

As shown in FIG. 14, in a state in which the TCV 50 is closed, a deviation is generated between the intake air flow rates (mass flow rates) on the top surface 8a side and the bottom surface 8b side inside the intake port 8 on the intake-air downstream side of the TCV 50. More specifically, this deviation is generated in a form such that the flow rate on the bottom surface 8b side inside the intake port 8, that is, the flow rate on side of the cooled wall surface at which the water jacket 12a is provided decreases in comparison to the flow rate on the top surface 8a side, that is, the flow rate on the side of the non-cooled wall surface. Further, as shown in FIG. 15, in a state in which the TCV 50 is opened fully, the intake air flows inside the intake port 8 along the central trajectory L1.

Figure 16:
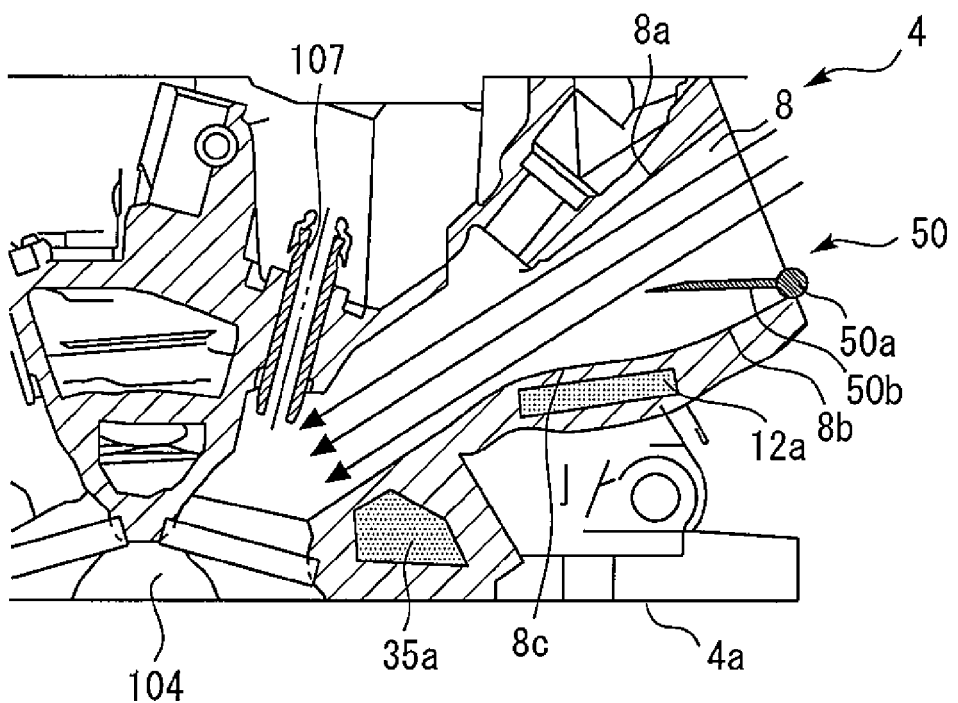
FIG. 16 is a view that schematically illustrates an intake air flow inside an intake port in a state in which a TCV is open to an intermediate degree of opening.

In this respect, in a state in which the TCV 50 is opened to an intermediate degree of opening as shown in FIG. 16, in a region in which the inclined wall surface 8c is formed on the intake-air downstream side of the TCV 50, a deviation is generated between the intake air flow rates (mass flow rates) on the top surface 8a side and the bottom surface 8b side inside the intake port 8. More specifically, this deviation is generated in a form such that the flow rate of intake air that flows along the inclined wall surface 8c at which the water jacket 12a is provided decreases in comparison to the flow rate of intake air that flows along the top surface 8a side. Further, when the inclined wall surface 8c is provided on the intake-air downstream side of the TCV 50, the flow rate of intake air that flows along the inclined wall surface 8c can be decreased even without closing the TCV 50 to a large degree, and hence a larger flow channel is secured on the top surface 8a side of the intake port 8.

That is, according to the configuration of the cylinder head of the present embodiment, when the TCV 50 is closed, the tumble flow can be strengthened and the intake air cooling capacity can also be lowered with favorable responsiveness. Further, when the TCV 50 is opened fully, the intake air cooling capacity can be increased with favorable responsiveness without strengthening the tumble flow (that is, without increasing the pressure loss of the intake air). In addition, when the TCV 50 is opened to an intermediate degree of opening, the intake air cooling capacity can be lowered with favorable responsiveness without strengthening the tumble flow (that is, without increasing the pressure loss of the intake air). Therefore, by using the aforementioned three forms that correspond to degrees of opening of the TCV 50 in an appropriate manner according to the operating region, it is possible to respond to both of a tumble flow strengthening request and an intake air cooling request with even better responsiveness.

Note that although the predetermined intermediate degree of opening is not particularly limited, for example, the predetermined intermediate degree of opening can be set to a degree of opening at which a distance from a distal end of the valve body 50b of the TCV 50 to the central trajectory L1 becomes equal to a distance from an end on the intake-air downstream side of the inclined wall surface 8c to the central trajectory L1, or to a degree of opening at which a flow channel cross-sectional area is obtained that is equal to a flow channel cross-sectional area at the end on the intake-air downstream side of the inclined wall surface 8c. According to such degrees of opening, even in a case where the TCV 50 is opened to the intermediate degree of opening, a flow channel cross-sectional area can be secured that is the same as at the end on the intake-air downstream side of the inclined wall surface 8c, and hence an increase in the pressure loss of intake air can be effectively suppressed by the TCV 50.

Figure 17:
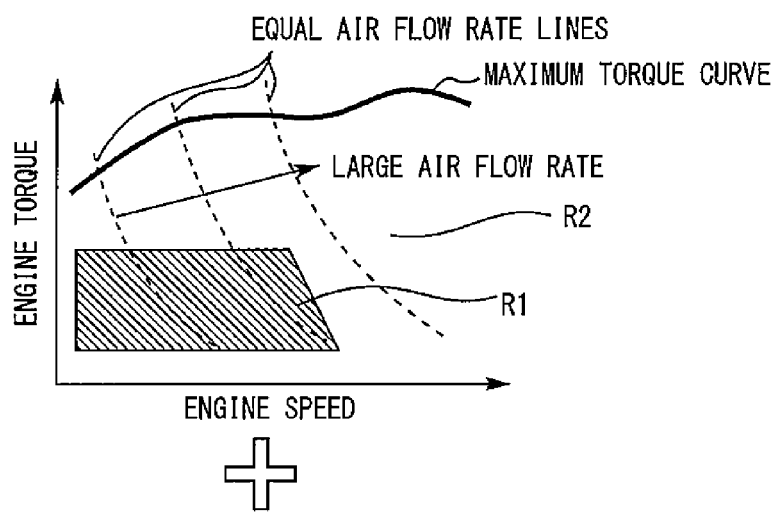
FIG. 17 is a multiple view drawing for describing requests with respect to respective operating regions of an engine.
Figure 17:
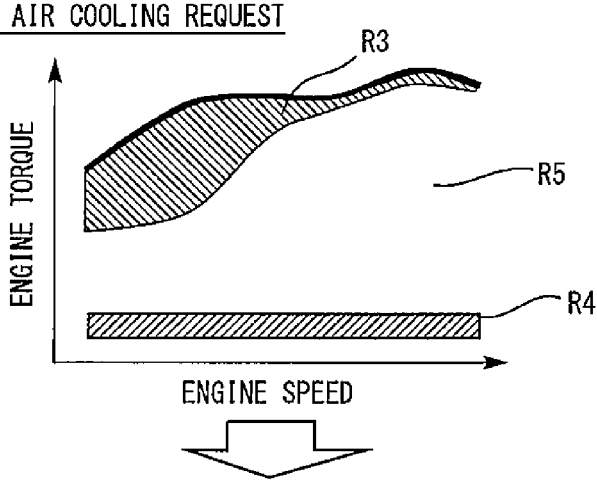
Figure 17:
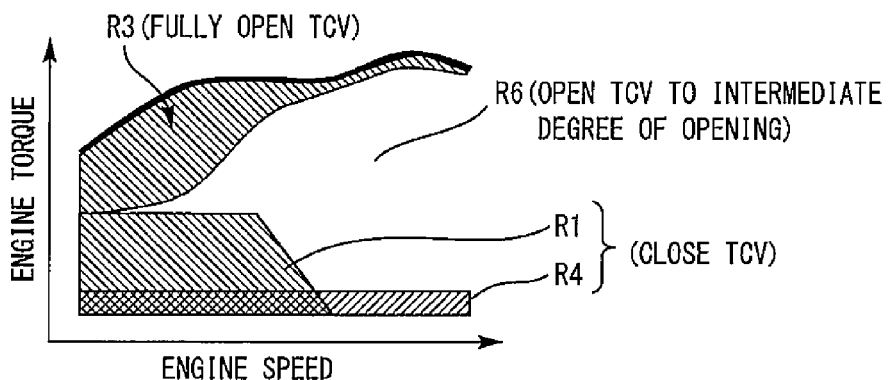

FIG. 17 is a multiple view drawing for describing requests with respect to each operating region of the engine 2. FIG. 17A is a view that illustrates engine operating regions from the viewpoint of a request to strengthen a tumble flow. FIG. 17B is a view that illustrates engine operating regions from the viewpoint of an intake air cooling request. FIG. 17C is a view that illustrates engine operating regions obtained by superimposing the respective regions shown in FIG. 17A and the respective regions shown in FIG. 17B. Note that, because a region R1 to a region R6 shown in the respective views of FIG. 17 are the same as the region R1 to the region R6 shown in the above described FIG. 7, a duplicate description thereof is omitted as appropriate.

When consideration is given to both a tumble flow strengthening request and an intake air cooling request, the following facts are found. That is, first, as shown in FIG. 17C, in the region R1 in which there is a tumble flow strengthening request and the region R4 in which, in order to ensure combustion stability, intake air cooling is not possible, it is preferable to close the TCV 50. By this means, both a tumble flow strengthening request and a request that makes intake air cooling unnecessary or not possible are satisfied.

Further, as shown in FIG. 17C, in the region R3 in which strengthening of a tumble flow is unnecessary (that is, it is preferable for the TCV 50 to be open) and intake air cooling is necessary, it is preferable to fully open the TCV 50. By this means, both a request that makes tumble flow strengthening unnecessary and a request that makes intake air cooling unnecessary or not possible are satisfied.

In addition, as shown in FIG. 17C, in the region R6 in which strengthening of the tumble flow is unnecessary (that is, it is preferable for the TCV 50 to be open) and in which whether intake air cooling is necessary or not is irrelevant, it is preferable to open the TCV 50 to the predetermined intermediate degree of opening. By this means, both a request that makes tumble flow strengthening unnecessary and a request that makes intake air cooling irrelevant are satisfied.

Thus, according to the configuration of the present embodiment, in a state in which the TCV 50 is opened fully, intake air that is cooled by the water jacket 12a can be supplied into the combustion chamber 104 while ensuring not to strengthen the tumble flow. Further, in a state in which the TCV 50 is closed, the tumble flow can be strengthened by mainly utilizing intake air that is not cooled by the water jacket 12a, and a request that disables the performance of intake air cooling can also be dealt with. In addition, in a state in which the TCV 50 is opened to a predetermined intermediate degree of opening, intake air that is not cooled by the water jacket 12a can be supplied into the combustion chamber 104 while ensuring not to strengthen the tumble flow. By this means, frequent changes regarding the existence/non-existence of an intake air cooling request can be responded to with favorable responsiveness without relying on adjustment of the temperature of the LT cooling water. Consequently, even when the operating region transiently changes, for example, since combustion can be made more suitable by suppressing retardation of the ignition timing, an improvement in fuel consumption and shortening of the acceleration time can be achieved.

3. Specific Processing of Intake Air Cooling Control Using TCV

Figure 18:
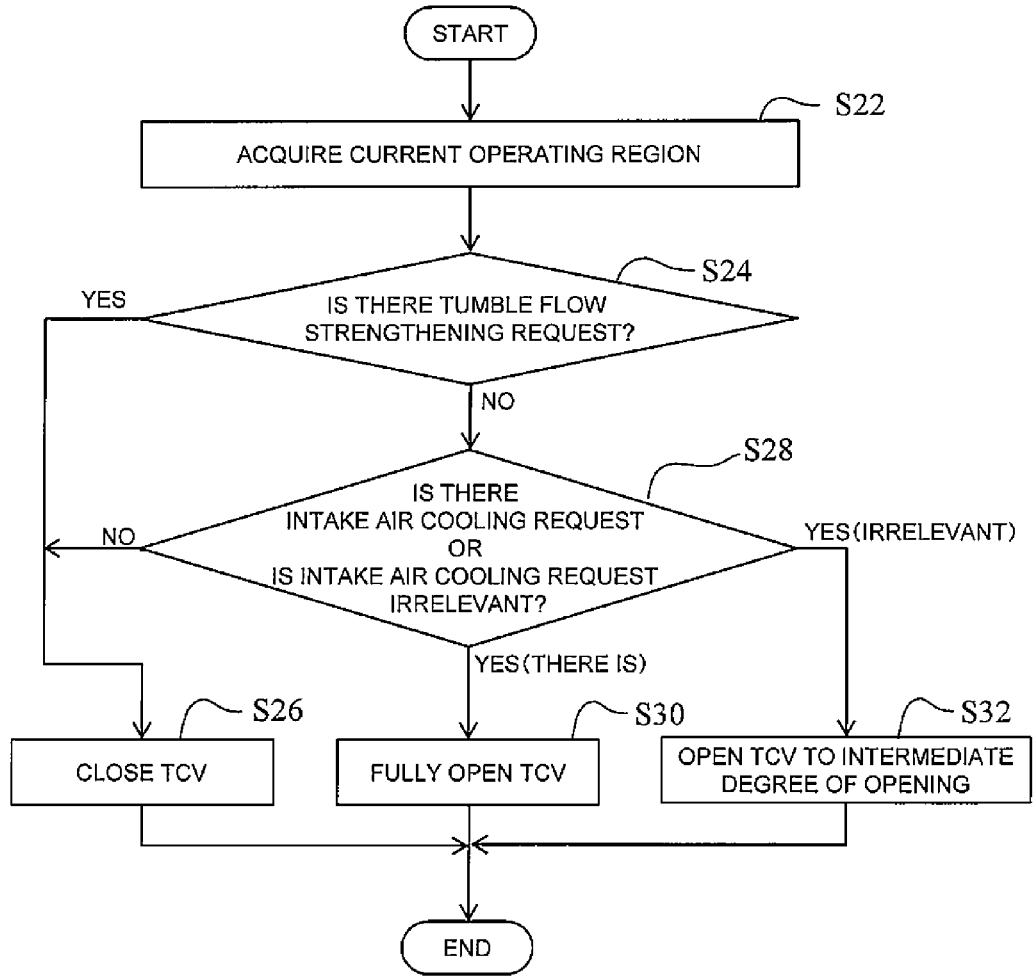
FIG. 18 is a flowchart illustrating a control flow of intake air cooling control of the second embodiment.

Next, specific processing of the intake air cooling control using the TCV 50 will be described referring to a flowchart. The control apparatus 80 controls the degree of opening of the TCV 50 to cool intake air that passes through the intake port 8. FIG. 18 is a flowchart illustrating a control flow of the intake air cooling control that is performed by the control apparatus 80. The control apparatus 80 repeatedly executes a routine represented by this control flow at predetermined control periods that correspond to the clock speed of the ECU.

In step S22 to step S28 in the routine illustrated in FIG. 18, processing that is the same as the processing from step S12 to step S18 that is described above is executed. If the result determined by the processing in step S28 is that the current operating region belongs to the region R4, it is determined that there is not an intake air cooling request, and the operation moves to step S26 in which the TCV 50 is closed. In contrast, if the result determined by the processing in step S28 is that the current operating region belongs to the region R3, it is determined that there is an intake air cooling request, and the operation moves to the next step to fully open the TCV 50 (step S30). Further, if the result determined by the processing in step S28 is that the current operating region belongs to the region R6, it is determined that an intake air cooling request is irrelevant, and the operation moves to the next step, in which the TCV 50 is opened to the predetermined intermediate degree of opening (step S32).

Thus, according to the control apparatus of the present embodiment, it is possible to respond with favorable responsiveness to a tumble flow strengthening request and an intake air cooling request with respect to the engine 2.

4. Modifications

Note that the present invention is not limited to the above described embodiment, and various modifications can be made without departing from the spirit and scope of the present invention. For example, the modifications described hereunder may be made.

Figure 19:
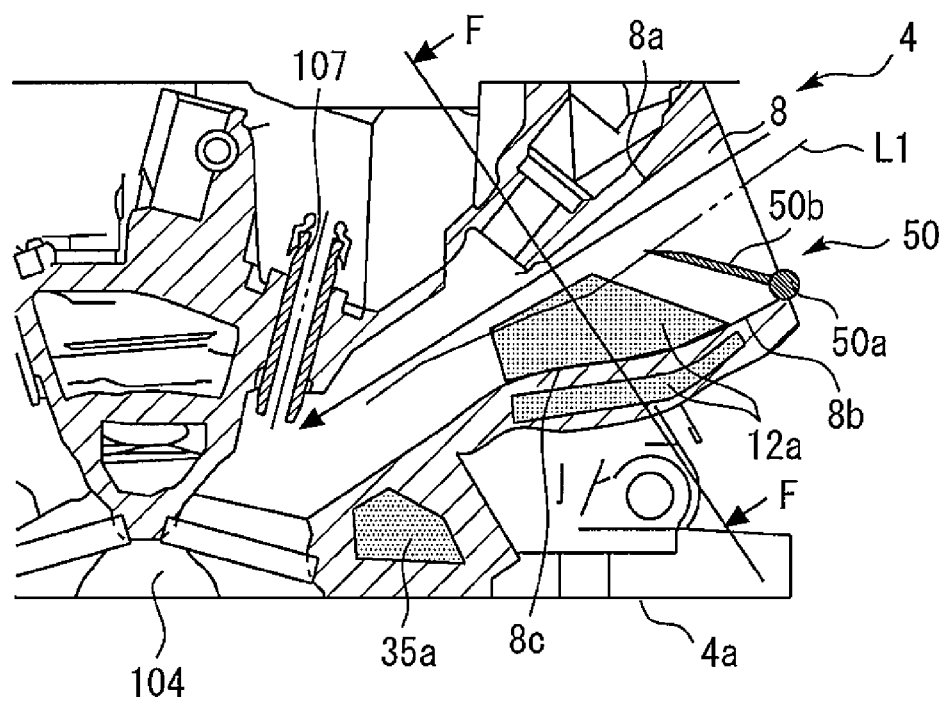
FIG. 19 is a cross-sectional view for describing a configuration of a water jacket as a modification.

The water jacket 12a may also be configured to cover an area as far as the side faces of the intake port 8. FIG. 19 is a cross-sectional view for describing a configuration of the water jacket as a modification, and illustrates a cross section that is perpendicular to a longitudinal direction (direction of the crankshaft) including the central axis of the intake valve insertion hole of the cylinder head. Note that, since the configuration of principal portions at a cross section that is obtained when the cylinder head illustrated in FIG. 19 is cut along a cross section F-F that is perpendicular to the central trajectory L1 is the same as in the above described FIG. 10, FIG. 10 will be referred to as appropriate. In the example illustrated in these drawings, the water jacket 12a is configured to cover an area as far as the side walls on the bottom surface 8b side of the intake port 8 on the intake-air downstream side of the TCV 50. According to this configuration the cooling capacity in a case where the TCV 50 is opened can be further increased, and hence it is possible to further improve the response performance with respect to an intake air cooling request.

The TCV 50 and the water jacket 12a may also be provided on the top surface 8a side of the intake port 8. In this case, with respect to the configuration illustrated in FIG. 11 and FIG. 12 that are described above, it is sufficient to configure a region at which the water jacket 12*a* is provided of the top surface 8*a* of the intake port 8 as the inclined wall surface 8*c*. Further, although in the example illustrated in FIG. 11 and FIG. 12 the water jacket 12*a* is configured to cover an area as far as the side walls on the top surface 8*a* side of the intake port 8 on the intake-air downstream side of the TCV 50, it is sufficient to provide the water jacket 12*a* so as to cover a portion of the top surface 8*a* of the intake port 8 at least at any one cross section among cross sections that are perpendicular to the central trajectory L1 on the intake-air downstream side of the TCV 50.

The TCV 50 and the water jacket 12*a* may also be configured as illustrated in FIG. 13 that is described above. In this case, with respect to the configuration illustrated in FIG. 13, it is sufficient to configure a region at which the water jacket 12*a* is provided of the top surface 8*a* of the intake port 8 as the inclined wall surface 8*c*. Further, although in the example illustrated in FIG. 13 the water jacket 12*a* is configured to cover an area as far as the side walls on the bottom surface 8*b* side of the intake port 8 on the intake-air downstream side of the TCV 50, it is sufficient to provide the water jacket 12*a* so as to cover a portion of the bottom surface 8*b* of the intake port 8 at least at any one cross section among cross sections that are perpendicular to the central trajectory L1 on the intake-air downstream side of the TCV 50.

Note that, in the control apparatus of the second embodiment that is described above, the LT cooling water circulation system 10 corresponds to "low-temperature cooling water circulation system" of the first invention, the in-head LT cooling water channel 12 corresponds to "low-temperature cooling water channel" of the first invention, the HT cooling water circulation system 30 corresponds to "high-temperature cooling water circulation system" of the first invention, the in-head HT cooling water channel 35 corresponds to "high-temperature cooling water channel" of the first invention, the water jacket 12*a* corresponds to "water jacket" of the first invention, the cooled wall surface corresponds to "first wall surface" of the first invention, the non-cooled wall surface corresponds to "second wall surface" of the first invention, and the TCV 50 corresponds to "airflow control valve" of the first invention.

In addition, in the control apparatus of the second embodiment that is described above, the control apparatus 80 corresponds to "control apparatus" of the second invention, the region R3 corresponds to "intake-air-cooling necessary region" of the second invention, and the region R4 or region R5 corresponds to "intake-air-cooling unnecessary region" of the second invention.

Further, in the control apparatus of the second embodiment that is described above, the control apparatus 80 corresponds to "control apparatus" of the seventh invention, the region R1 corresponds to "first operating region" of the seventh invention, and the region R2 corresponds to "second operating region" of the seventh invention.

Furthermore, in the control apparatus of the second embodiment that is described above, the inclined wall surface 8*c* corresponds to "inclined wall surface" of the eighth invention.

The invention claimed is:

1. An internal combustion engine, comprising:
    a low-temperature cooling water circulation system that is one of two cooling water circulation systems in which temperatures of cooling water are different, and that causes cooling water of a low temperature to circulate in a low-temperature cooling water channel formed in the internal combustion engine; and
    a high-temperature cooling water circulation system that is one of the two cooling water circulation systems, and that causes cooling water of a high temperature to circulate in a high-temperature cooling water channel formed in the internal combustion engine,
    the low-temperature cooling water channel including a water jacket covering at least one portion of a wall surface of an intake port,
    the intake port including:
    a first wall surface that is an inner wall surface covered by the water jacket at least at one cross section among cross-sections that are perpendicular to a central trajectory of the intake port and a second wall surface that is an inner wall surface not covered by the water jacket at least at the one cross section;
    a control apparatus that controls the airflow control valve based on an operating region that is determined based on a speed and a load of the internal combustion engine;
    wherein the internal combustion engine comprises an airflow control valve provided on an intake-air upstream side of the first wall surface, the airflow control valve being configured to be capable of changing a ratio between a flow rate of intake air that flows on a side of the first wall surface and a flow rate of intake air that flows on a side of the second wall surface, and
    wherein the control apparatus is configured to actuate the airflow control valve so that a ratio of a flow rate of intake air that flows on the side of the first wall surface with respect to a flow rate of intake air that flows on the side of the second wall surface increases in a case where the operating region belongs to an intake-air-cooling necessary region in which intake air cooling is necessary in comparison to a case where the operating region belongs to an intake-air-cooling unnecessary region in which intake air cooling is unnecessary.

2. An internal combustion engine, comprising:
    a low-temperature cooling water circulation system that is one of two cooling water circulation systems in which temperatures of cooling water are different, and that causes cooling water of a low temperature to circulate in a low-temperature cooling water channel formed in the internal combustion engine; and
    a high-temperature cooling water circulation system that is one of the two cooling water circulation systems, and that causes cooling water of a high temperature to circulate in a high-temperature cooling water channel formed in the internal combustion engine,
    the low-temperature cooling water channel including a water jacket covering at least one portion of a wall surface of an intake port,
    the intake port including:
    a first wall surface that is an inner wall surface covered by the water jacket at least at one cross section among cross-sections that are perpendicular to a central trajectory of the intake port and a second wall surface that is an inner wall surface not covered by the water jacket at least at the one cross section;
    a control apparatus that controls the tumble control valve based on an operating region that is determined based on a speed and a load of the internal combustion engine;
    wherein the internal combustion engine comprises an airflow control valve provided on an intake-air upstream side of the first wall surface, the airflow control valve being configured to be capable of changing a ratio between a flow rate of intake air that flows on a side of the first wall surface and a flow rate of intake air that flows on a side of the second wall surface, wherein the airflow control valve is a tumble control valve in which a valve body is driven around a rotary shaft to perform adjustment of a degree of opening thereof, wherein the control apparatus is configured so that, in a case where the operating region belongs to a first operating region in which it is necessary to strengthen a tumble flow that is generated inside a cylinder, the control apparatus actuates the tumble control valve to a closing side more than in a case where the operating region belongs to a second operating region that is an operating region excluding the first operating region, wherein the intake port includes an inclined wall surface that inclines so as to progressively approach a central trajectory of the intake port in an intake-air downstream direction, wherein the first wall surface is provided on the inclined wall surface, and wherein the control apparatus is configured so that, in a case where the operating region belongs to an intake-air-cooling unnecessary region in which intake air cooling is unnecessary and also belongs to the second operating region, the control apparatus actuates the tumble control valve to a predetermined intermediate degree of opening.

3. The internal combustion engine according to claim 2, wherein:

the rotary shaft of the tumble control valve is provided on a side of the first wall surface, and the first wall surface is provided on an opposite side to a side of a cylinder block mating surface of the intake port.

4. The internal combustion engine according to claim 2, wherein:

the first wall surface is provided on a side of a cylinder block mating surface of the intake port; and the tumble control valve has a configuration in which:

the rotary shaft is provided that extends from an inner wall surface of the intake port towards a facing inner wall surface, at a distal end portion of a support shaft that extends in a perpendicular direction from a position partway along the rotary shaft is provided the valve body that extends in a direction that is perpendicular to the support shaft, in a state in which the tumble control valve is open, the valve body is moved to a position along a side of the first wall surface, and as the tumble control valve closes, the valve body moves so as to block the intake port from the side of the first wall surface.

5. The internal combustion engine according to claim 2, wherein:

the rotary shaft of the tumble control valve is provided on a side of the first wall surface, and the first wall surface is provided on a side of a cylinder block mating surface of the intake port.

* * * * *